United States Patent
Mykland

(10) Patent No.: US 9,304,770 B2
(45) Date of Patent: Apr. 5, 2016

(54) METHOD AND SYSTEM ADAPTED FOR CONVERTING SOFTWARE CONSTRUCTS INTO RESOURCES FOR IMPLEMENTATION BY A DYNAMICALLY RECONFIGURABLE PROCESSOR

(71) Applicant: Robert Keith Mykland, Capitola, CA (US)

(72) Inventor: Robert Keith Mykland, Capitola, CA (US)

(*) Notice: Subject to any disclaimer, the term of this patent is extended or adjusted under 35 U.S.C. 154(b) by 169 days.

(21) Appl. No.: 13/722,831

(22) Filed: Dec. 20, 2012

(65) Prior Publication Data
US 2014/0013080 A1    Jan. 9, 2014

Related U.S. Application Data

(63) Continuation-in-part of application No. 13/493,962, filed on Jun. 11, 2012, now Pat. No. 9,158,544, and a continuation-in-part of application No. 13/301,763, filed on Nov. 21, 2011, and a continuation-in-part of application No. 13/360,805, filed on Jan. 30, 2012, now Pat. No. 8,856,768, and a continuation-in-part of application No. 13/429,198, filed on Mar. 23, 2012, now Pat. No. 8,869,123.

(51) Int. Cl.
*G06F 7/00* (2006.01)
*G06F 9/30* (2006.01)
*G06F 9/44* (2006.01)

(52) U.S. Cl.
CPC .............. *G06F 9/30145* (2013.01); *G06F 8/30* (2013.01); *G06F 9/4436* (2013.01)

(58) Field of Classification Search
CPC .............. G06F 7/78; G06F 8/00–8/78; G06F 9/44–9/455; G06F 11/36
USPC ................................................ 717/100–178
See application file for complete search history.

(56) References Cited

U.S. PATENT DOCUMENTS

| 5,317,743 A | 5/1994 | Imai et al. |
| 5,465,373 A | 11/1995 | Kahle et al. |
| 5,488,707 A | 1/1996 | Phillips et al. |

(Continued)

OTHER PUBLICATIONS

Goldstein et al., PipeRench A Reconfigurable Architecture and Compiler, 2000.*

(Continued)

*Primary Examiner* — Wei Zhen
*Assistant Examiner* — Zhan Chen
(74) *Attorney, Agent, or Firm* — Patrick Reilly

(57) ABSTRACT

A method and system are provided for deriving a resultant software code from an originating ordered list of instructions that does not include overlapping branch logic. The method may include deriving a plurality of unordered software constructs from a sequence of processor instructions; associating software constructs in accordance with an original logic of the sequence of processor instructions; determining and resolving memory precedence conflicts within the associated plurality of software constructs; resolving forward branch logic structures into conditional logic constructs; resolving back branch logic structures into loop logic constructs; and/or applying the plurality of unordered software constructs in a programming operation by a parallel execution logic circuitry. The resultant plurality of unordered software constructs may be converted into programming reconfigurable logic, computers or processors, and also by means of a computer network or an electronics communications network.

20 Claims, 27 Drawing Sheets

(56) References Cited

U.S. PATENT DOCUMENTS

| | | |
|---|---|---|
| 5,822,591 A | 10/1998 | Hochmuth |
| 5,950,009 A | 9/1999 | Bortnikov et al. |
| 5,966,536 A | 10/1999 | Ravichandran |
| 5,974,538 A | 10/1999 | Wilmot, II |
| 6,438,737 B1 | 8/2002 | Morelli et al. |
| 6,717,436 B2 | 4/2004 | Kress et al. |
| 6,832,370 B1 | 12/2004 | Srinivasan et al. |
| 6,868,017 B2 | 3/2005 | Ikeda |
| 6,907,592 B1 | 6/2005 | Dante |
| 6,988,183 B1 | 1/2006 | Wong |
| 7,076,575 B2 | 7/2006 | Baitinger et al. |
| 7,155,602 B2 | 12/2006 | Poznanovic |
| 7,167,976 B2 | 1/2007 | Poznanovic |
| 7,171,659 B2 | 1/2007 | Becker et al. |
| 7,840,777 B2 | 11/2010 | Mykland |
| 7,840,950 B2 | 11/2010 | Stoodley et al. |
| 7,930,668 B1 | 4/2011 | Parsa |
| 8,078,849 B2 | 12/2011 | Libby et al. |
| 2003/0233595 A1 | 12/2003 | Charny et al. |
| 2004/0019765 A1 | 1/2004 | Klein, Jr. |
| 2004/0068329 A1 | 4/2004 | Mykland |
| 2004/0073899 A1* | 4/2004 | Luk et al. .................. 717/158 |
| 2004/0088685 A1* | 5/2004 | Poznanovic et al. .......... 717/140 |
| 2004/0107331 A1 | 6/2004 | Baxter |
| 2005/0044195 A1 | 2/2005 | Westfall |
| 2006/0004997 A1 | 1/2006 | Mykland |
| 2006/0031600 A1 | 2/2006 | Ellis et al. |
| 2006/0242385 A1* | 10/2006 | Murakami .......... G06F 9/30145 712/200 |
| 2006/0248317 A1 | 11/2006 | Vorbach et al. |
| 2007/0198971 A1* | 8/2007 | Dasu et al. .................. 717/140 |
| 2008/0005498 A1 | 1/2008 | Moreno et al. |
| 2008/0189703 A1* | 8/2008 | Im .......................... G06F 9/4881 718/100 |
| 2009/0119490 A1 | 5/2009 | Oh et al. |
| 2009/0119654 A1 | 5/2009 | Kawahito et al. |
| 2009/0240928 A1 | 9/2009 | Fischer et al. |
| 2009/0241083 A1 | 9/2009 | Olgiati et al. |
| 2010/0185839 A1 | 7/2010 | Oh et al. |
| 2011/0113411 A1 | 5/2011 | Yonezu |
| 2012/0096444 A1 | 4/2012 | Wright et al. |
| 2012/0331450 A1 | 12/2012 | Mykland |

OTHER PUBLICATIONS

U.S. Appl. No. 13/301,763, filed Nov. 2011, Mykland, R.K.

* cited by examiner

SECOND SOFTWARE CONSTRUCT C.02

| C.ID | EXP.01 | EXP.02 | EXP.N | INFO.01 | INFO.02 | INFO.N | INFO.ADD |

BUBBLE REORD BREC.001

| BREC.ID | B.ID | DFM.001 | DFM.002 | DFM.003 | DATA |
|---|---|---|---|---|---|

DATA FLOW MODEL REORD DFMREC.001

| DFMREC.ID | DFM.ID | SR.001 | SR.002 | SR.101 | DATA |
|---|---|---|---|---|---|

METHOD AND SYSTEM ADAPTED FOR CONVERTING SOFTWARE CONSTRUCTS INTO RESOURCES FOR IMPLEMENTATION BY A DYNAMICALLY RECONFIGURABLE PROCESSOR

CO-PENDING PATENT APPLICATIONS

This Nonprovisional patent application is also a Continuation-in-Part application to Nonprovisional patent application Ser. No. 13/493,962, filed on Jun. 11, 2012 by inventor Robert Mykland and titled "SYSTEM AND METHOD FOR PERFORMING A BRANCH OBJECT CONVERSION TO PROGRAM CONFIGURABLE LOGIC CIRCUITRY". Nonprovisional patent application Ser. No. 13/493,962 is hereby incorporated by reference in its entirety and for all purposes, to include claiming benefit of the priority date of filing of Nonprovisional patent application Ser. No. 13/493,962.

This Nonprovisional patent application is also a Continuation-in-Part application to Nonprovisional patent application Ser. No. 13/301,763, filed on Nov. 21, 2011 by inventor Robert Mykland and titled "CONFIGURABLE CIRCUIT ARRAY". Nonprovisional patent application Ser. No. 13/301,763 is hereby incorporated by reference in its entirety and for all purposes, to include claiming benefit of the priority date of filing of Nonprovisional patent application Ser. No. 13/301,763.

This Nonprovisional patent application is additionally a Continuation-in-Part application to Nonprovisional patent application Ser. No. 13/360,805, filed on Jan. 30, 2012 by inventor Robert Mykland and titled "SYSTEM AND METHOD FOR COMPILING MACHINE-EXECUTABLE CODE GENERATED FROM A SEQUENTIALLY ORDERED PLURALITY OF PROCESSOR INSTRUCTIONS". Nonprovisional patent application Ser. No. 13/360,805 is hereby incorporated by reference in its entirety and for all purposes, to include claiming benefit of the priority date of filing of Nonprovisional patent application Ser. No. 13/360,805.

Further more, this Nonprovisional patent application is a Continuation-in-Part application to Nonprovisional patent application Ser. No. 13/429,198, filed on Mar. 23, 2012 by inventor Robert Mykland and titled "SYSTEM AND METHOD FOR APPLYING A SEQUENCE OF OPERATIONS CODE TO PROGRAM CONFIGURABLE LOGIC CIRCUITRY". Nonprovisional patent application Ser. No. 13/429,198 is hereby incorporated by reference in its entirety and for all purposes, to include claiming benefit of the priority date of filing of Nonprovisional patent application Ser. No. 13/429,198.

FIELD OF THE INVENTION

The present invention relates to software, data processing and information technology. More particularly, the present invention relates to methods of, and systems for generating software code for execution by a dynamically reconfigurable processor

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Prior art computers based on the design innovations of Turing and von Neumann currently dominate the field of general purpose computing. Yet this brilliant and fundamental design work was originally done within a narrow goal set in mind, i.e., the decryption of encrypted messages, and with the several now anachronistic constraints. The Turing and von Neumann computer architectures were also driven by a criterion of defining a simplest computer design that could effectively perform decryption of communications with the manufacturing technology available in the early 1940's. While electronics technology has dramatically evolved in the ensuing decades to empower the commercially feasible manufacture of increasingly more powerful logic circuits and more complex data processing systems, the prior art of computational system design has remained fixated upon complying with the design concepts and constraints selected by Turing and von Neumann that were established under the technological limitations and military necessities existent during the Second World War.

The Applicant has disclosed a radically new approach to the design of computational systems in both U.S. Pat. No. 7,840,777 and U.S. patent application Ser. No. 13/301,763 that each embody an inventive concept of computational design that is a novel and non-obvious departure from prior art computer design. In one singularly novel quality of the method of the present invention, the configurable circuit array of U.S. patent application Ser. No. 13/301,763 enables the automatic application of the entire command set of certain high level languages to be automatically applied to computationally efficiently configure logic circuitry to essentially instantiate the logic of the originating high level source code without human operator intervention. More specifically, the method of the present invention enables the automated application of the higher level programming languages of FORTRAN, C, the Gnu C Complier ("GCC"), C++ and JAVA by means of configurable logic and thereby instantiate logic of source code software programs written in each of these languages, such as the LINUX Operating System, into a logic circuit configuration In prior art computing, the input to the prior art computer is a sequential series of instructions that selected from finite instruction set. In contrast, the method of the present invention discloses that the invented processor need not have such an instruction set, but rather may execute a series of complex instructions that are applied to dynamically reconfigure a target circuit on the fly. The method of the present invention provides a compiler that extracts the logic, values, parameters, information and interrelationships of a sequence of instructions to efficiently configure a series of reconfigurable circuits coupled with memory operations. The invented compiler thereby accepts and automatically converts the logical flow of an arbitrarily long series of high level language instructions into an arbitrarily long sequence of reconfigurations of an array of reconfigurable circuits coupled with memory operations in order to functionally and practically perform a wide range of general purpose computing processes.

The prior art additionally includes reconfigurable logic circuitry that can be configured or reconfigured to at least partially implement data processing methods in accordance with a software program or software coded instructions. The prior art further provides software programs that consist of sequences of machine-executable commands that are organized as ordered lists of instructions that may be executed by a conventional, general purpose computer and that may allow for and include logical branching. However the use of software designed to be sequentially executed line-line by one or more central processor or arithmetic logic units may not allow for a more efficient operation possible by the special class of computational devices that may be configured, programmed and/or executed at least partly with parallel logic processing techniques. Furthermore, prior techniques of assigning computational circuitry, e.g., electronic circuitry, of an information technology system to support the implementation of a software program are dependent upon the nature of the hardware design of the information technology system.

There is therefore a long-felt need to provide methods and systems that enable a more efficient mapping of originating software coded information, to include but not limited to instructions, onto assignable and functionality appropriate types of logic circuits, such as electronic components of a dynamically reconfigurable processor. It is an additional object of the method of the present invention to provide a process that automatically derives software constructs that may be applied to dynamically reconfigure the reconfigurable elements and aspects of a dynamically reconfigurable processor.

SUMMARY AND OBJECTS OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It is an object of the method of the present invention (hereinafter "invented method") to provide a method and a system that enable the correlation or assignment of software resources that represent components by type of a dynamically reconfigurable processor in accordance with the encoded information of an originating software program.

Towards these objects and other objects that will be made obvious in light of this disclosure, a first version of the invented method that applies and/or provides a dynamically reconfigurable processor that includes a plurality of assignable components, wherein many of these components are distinguishable by types of functionality, capability and/or structure. Optional and alternative aspects of the invented method assign one or more circuit elements of an information technology system in accordance with and/or in correspondence to one or more aspects of information coded in software, to include but not limited to a software construct.

It is an optional object of the method of the invented method to derive from a plurality software constructs one or more software encoded collections, wherein each collection references or includes one or more software resources, and each software resource corresponds to an asset, aspect, circuit and/or component of a dynamically reconfigurable processor, and further that that each software encoded collection does not contain references to that exceed a preset count of assets, aspects, circuits and/or components of a preselected dynamically reconfigurable processor. Preferably, in certain additional embodiments of the invented method, a software encoded collection, e.g., a resultant bubble, will not include references to software resources that exceed the count of corresponding assets, aspects, circuits and/or components of a selected design of a dynamically reconfigurable processor, whereby the software encoded collection may be fully applied to reconfigure a dynamically reconfigurable processor of the selected design in a single contemporaneous reconfiguration process. In other words, it is preferable that a software encoded collection, e.g., a resultant bubble, be constrained in size to allow the selected dynamically reconfigurable processor to be reconfigured in full conformance with the software encoded collection in a unified reconfiguration operation and/or as a single instruction.

Certain alternate preferred embodiments of the invented method provide computer-implemented selection of a software operation and the association of one or more software models corresponding to one or more digital hardware elements of a dynamically reconfigurable processor with the selected software operation, wherein the digital hardware elements that correspond to the associated software models are capable of instantiating or embodying the logic and functionality of the selected software operation.

Certain still alternate preferred embodiments of the invented method alternately or additionally provide computer-implemented selection of a software operation and the association of one or more software models corresponding to one or more digital hardware elements of a dynamically reconfigurable processor with the selected software operation, wherein the digital hardware elements that correspond to the associated software models are capable of instantiating or embodying the logic and functionality of the selected software operation.

Certain other alternate preferred embodiments of the invented method provide computer-implemented software models that each correspond to one or more digital hardware elements of a dynamically reconfigurable processor, whereby the digital hardware elements that correspond to the associated software models are capable of instantiating or embodying the logic and functionality of a selected software operation.

It is understood that the scope of definition of the term "software construct" of the present disclosure includes a software coded or software coded logical statement or instruction that may include (a.) an instruction such as an opcode, a command, machine-executable instruction; (b.) a null instruction, i.e., an instruction to not perform an operation, e.g. a no-op opcode; (c.) a datum or data; (d.) a variable; (e.) references to additional commands, data and variables; and/or other or additional opcode, mathematical expression or logic algorithm that may be expressed or represented in software in a form that is executable by a computer or from which a machine-executable instruction can be derived, determined or compiled.

The invented processor includes a plurality of electronic elements at least some of which may be assignable and reassignable in accordance with a software construct or software coded information. Alternatively, one or more elements or components of the processor may be distinguishable by functionality, capability and/or structure. The processor further comprises an input circuitry that accepts and/or stores a plurality of software coded constructs, instructions, data and/or information.

Additionally or alternately, the invented system may include, and/or the invented method may provide and may be employable by, a reprogrammable logic unit in whole or in part as disclosed in U.S. Pat. No. 7,840,777 issued on Nov. 23, 2010 to inventor Robert Mykland and titled "Method and apparatus for directing a computational array to execute a plurality of successive computational array instructions at runtime" and a method of programming thereof.

Still additionally or alternately, the invented method optionally provides a reprogrammable logic unit as disclosed in US Nonprovisional patent application Ser. No. 13/301,763 filed on Nov. 21, 2011 to inventor Robert Mykland and titled "CONFIGURABLE CIRCUIT ARRAY" and a method of programming thereof.

DEFINITION OF CERTAIN TERMS

Certain new and special terms are used in the present disclosure and claims in describing various aspects of the invented method and invented processor, wherein these terms include the following:

An instruction is software encoded data that contains configuration information and optionally includes data to be processed, wherein the configuration information is applied by a dynamically reconfigurable processor to configure and/or reconfigure itself and accordingly process other data, wherein the other data is (a.) currently existent in the processor and/or (b.) provided in a same instruction that contains the configuration information.

A dynamically reconfigurable processor is a digital computing system, such as the dynamically reconfigurable processor disclosed in U.S. Pat. No. 7,840,777, that applies an instruction in order to configure and/or reconfigure and thereupon process information in accordance with the instruction.

The term component is defined herein to include any separately assignable digital circuit of a dynamically reconfigurable processor. Components of dynamically reconfigurable processors include suitable digital circuits and elements known in the art, to include cones, muxes, iterators, look up tables and logic gates as disclosed in U.S. Pat. No. 7,840,777.

A logic element is a digital circuit of a dynamically reconfigurable processor that comprises one or more components. Dynamically reconfigurable processors, such as the dynamically reconfigurable processor disclosed in U.S. Pat. No. 7,840,777, preferably contain a plurality of logic elements that are each formed with a same combination of components. The inclusion of a plurality of homogeneous logic elements in the invented processor is a preferred optional aspect of the invented method that generally increases the efficiency of the invented method. A logic element may include one or more cones, muxes, iterators, and logic gates as disclosed in U.S. Pat. No. 7,840,777 and/or one or more suitable digital circuits and elements known in the art. It is understood that not all components of a dynamically reconfigurable processor are part of a logic element.

A software resource, or "resource", is a software construct that mathematically models and represents a component or an aspect of a component of a dynamically reconfigurable processor. A resource may include configuration information and/or other information pertinent to the function, assignment, configuration and/or reconfiguration of the component. More specifically, a resource may be a generic resource identified by digital type, structure and/or function (b.) be associated with a specific component or aspect of a component, for example a specific input to an uniquely identified iterator of an individually identified logic element of a dynamically reconfigurable processor. Various resources may be or include mathematical models of the structure and functionality of, but not limited to, an iterator, cone, mux as disclosed in U.S. Pat. No. 7,840,777.

A resource bundle (hereinafter, "bundle") is one or more software resources that each model a component of the dynamically reconfigurable processor, whereby one or more components that can instantiate the logic and functionality of a software construct can be identified by type and can be represented as one or more resources that are specified by, or included in, a bundle. More particularly, a bundle may include one or more software resources that model the structure and functionality of one or more hardware components and/or logic elements of the dynamically reconfigurable processor.

A cell is a software construct that mathematically models and represents a logic element of a dynamically reconfigurable processor. A cell can contain pertinent resources associated with components of a relevant logic element or type of logic element. The cell may also contain configuration or other data pertinent to a particular logic element or logic element structure or type. As with resources, a cell can be either (a.) generic and identify a type of logic element or logic element structure; or (b.) specify a single and uniquely identified logic element of a dynamically reconfigurable processor.

A bubble is a software coded model that comprises a software coded collection of configuration information, data to be processed, resources, cells and optionally additional models of aspects of a reconfigurable processor. Bubbles are applied to generate potential instructions that may be developed into applied instructions. More particularly, a bubble is a mathematical model that preferably includes (a.) a plurality of software constructs that contain configuration information and optionally data to be processed; and (b.) resources and cells that mathematically model aspects, components and logic elements of the dynamically reconfigurable processor that would be required for, and enable, the dynamically reconfigurable processor to apply the configuration information and process the data in accordance with the configuration instruction. A bubble may thus be used to form a potential instruction and to determine if a potential instruction (a.) can be implemented by the dynamically reconfigurable processor; and/or (b.) shall be limited in size or content in order to be applicable by the dynamically reconfigurable processor. A bubble may also be applied to determine, estimate or forecast the efficiency of the dynamically reconfigurable processor in implementing an instruction or a potential instruction.

The term "resultant bubble" indicates a bubble that requires more components of the dynamically reconfigurable processor than may be reprogrammed in a single or unified reconfiguration method, step or action.

A data flow model is a software construct that organizes logical and mathematical operations, comprising but not limited to software opcodes and hardware circuits. Each input to each referenced or included operation may be or is linked back to a source of the related, included or referenced operation and input sources of each operation, and each output of each referenced or included operation may be or is linked to where the output is used in subsequent or dependent operations or calculations.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 8,078,849 (inventors: Libby, et al.; issued on Dec. 13, 2011) titled "Fast execution of branch instruction with multiple conditional expressions using programmable branch offset table"; U.S. Pat. No. 7,840,950 (titled Stoodley, et al.; issued on Nov. 23, 2010) titled "Programmatic compiler optimization of glacial constants"; U.S. Pat. No. 7,840,777 (inventor: Mykland; issued on Nov. 23, 2010) titled "Method and apparatus for directing a computational array to execute a plurality of successive computational array instructions at runtime"; U.S. Pat. No. 6,438,737 (inventors: Morelli, et al.; issued on Aug. 20, 2002) titled "Reconfigurable logic for a computer"; U.S. Pat. No. 7,171,659 (inventors: Becker, et al.; issued on Jan. 30, 2007) titled "System and method for configurable software provisioning"; U.S. Pat. No. 7,167,976 (inventor: Poznanovic, D.; issued on Jan. 23, 2007) titled "Interface for integrating reconfigurable processors into a general purpose computing system"; U.S. Pat. No. 7,155,602 (inventor: Poznanovic, D.; issued on Dec. 26, 2006) titled "Interface for integrating reconfigurable processors into a general purpose computing system"; U.S. Pat. No. 7,076,575 (inventor: Baitinger, et al.; issued on Jul. 11, 2006) titled "Method and system for efficient access to remote I/O functions in embedded control environments"; U.S. Pat. No. 6,868,017 (inventor: Ikeda, K.; issued on Mar. 15, 2005) titled "Integrated circuit device"; and U.S. Pat. No. 6,717,436 (inventors: Kress, et al.; issued on Apr. 6, 2004) titled "Reconfigurable gate array".

Such incorporations further include in U.S. Nonprovisional patent application Ser. No. 13/301,763 filed on Nov. 21, 2011 to inventor Robert Mykland and titled "CONFIGURABLE CIRCUIT ARRAY"; US Patent Appn. Publication Ser. No. 20060004997 (inventor: Mykland, Robert; published on Jan. 5, 2006) titled "Method and apparatus for computing"; US Patent Appn. Publication Ser. No. 20040068329 (inventor: Mykland, Robert; published on Apr. 8, 2004) titled "Method and apparatus for general purpose computing"; US Patent Appn. Publication Ser. No. 20040019765 (inventor: Klein, Robert C. JR.; published on Jan. 29, 2004) titled "Pipelined reconfigurable dynamic instruction set processor"; and US Patent Appn. Publication Ser. No. 20040107331 (inventor: Baxter, Michael A.; published on Jun. 3, 2004) titled "Meta-address architecture for parallel, dynamically reconfigurable computing".

In addition, each and all publications, patents, and patent applications mentioned in this specification are herein incorporated by reference to the same extent in their entirety and for all purposes as if each individual publication, patent, or patent application was specifically and individually indicated to be incorporated by reference. The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of the invention, may be better understood with reference to the accompanying specification and drawings depicting the preferred embodiment, in which.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
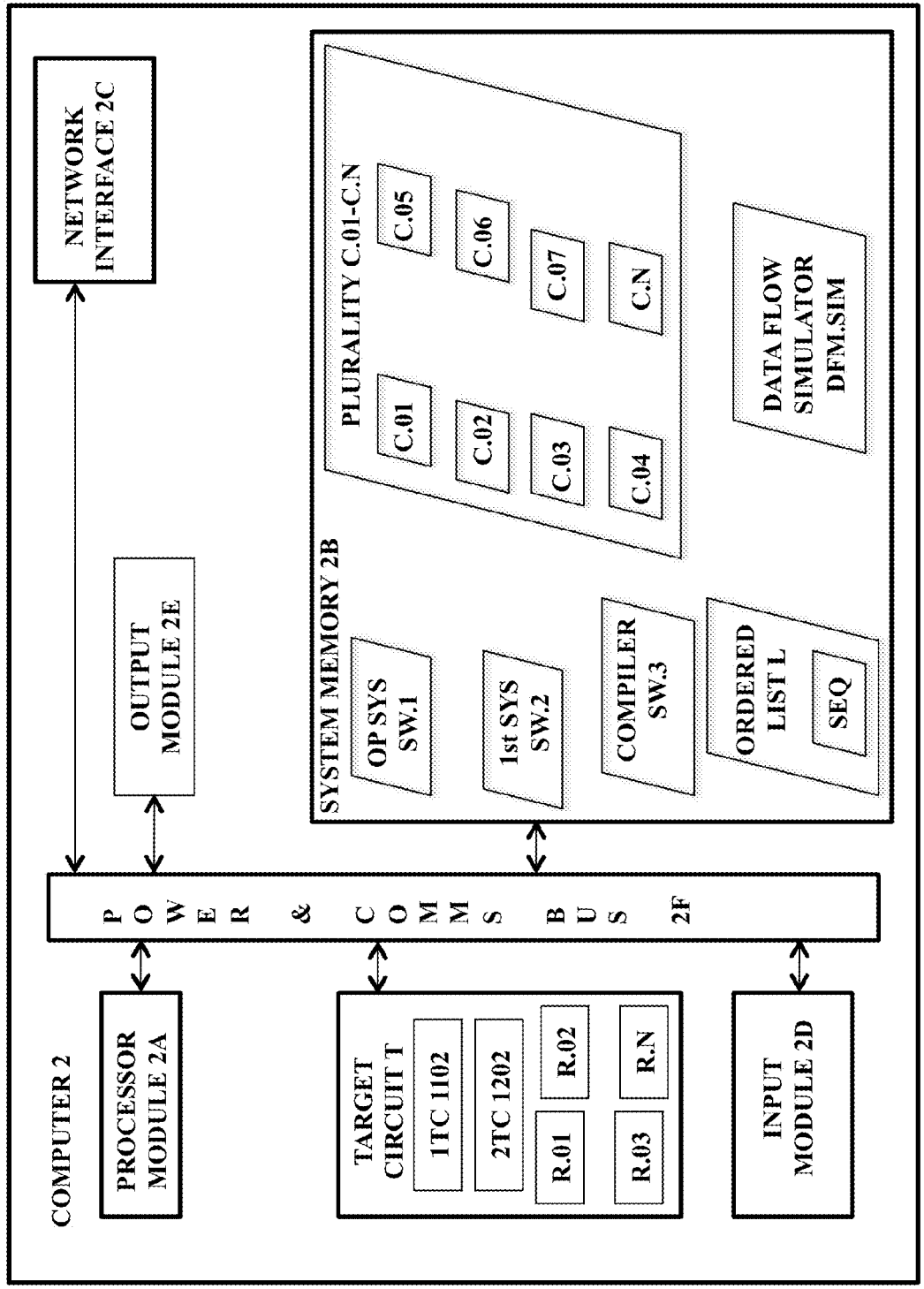
FIG. 1 is a functional block diagram of a prior art computational device having a processor module communicatively coupled with a memory module, a network interface, one or more input modules and one or more output modules.

FIG. 1 is a functional block diagram of the prior art computational device 2 (hereinafter "computer" 2) having the processor module 2A communicatively coupled with a memory module 2B, a network interface 2C, a data input module 2D, a data output module 2E, and a target circuit T. The processor module 2A may comprise one or more digital electronic microprocessors, such as, but not limited to, (a.) a CORE I7 Extreme Processor™ electronic microprocessor as marketed by Intel Corporation of Santa Clara, Calif.; (b.) a NEHALEM™ microprocessor as marketed by Intel Corporation of Santa Clara, Calif.; (c.) a reprogrammable logic unit as disclosed in U.S. Pat. No. 7,840,777 issued on Nov. 23, 2010 to inventor Robert Mykland and titled "Method and apparatus for directing a computational array to execute a plurality of successive computational array instructions at runtime"; and/or (d.) an other suitable electronic logic processors known in the art having programmable, reprogrammable, configurable and/or reconfigurable logic circuitry. The target circuit T may be or comprise a plurality of resources R.01-R.N that may include parallel processing circuitry, configurable logic circuitry, reconfigurable logic circuitry, and/or reprogrammable logic circuitry.

The computer 2 may be or comprise (a.) an IPHONE™ cellular telephone as marketed by Apple, Inc. of Cupertino; (b.) an IPAD™ tablet computer adapted for generation of digitized photographic documents and capable of bi-directional communications via the telephony network and the Internet 6 as marketed by Apple, Inc. of Cupertino, Calif.; (c.) an HTC TITAN II™ cellular telephone as marketed by AT&T, Inc. of Dallas, Tex. and running a WINDOWS 7™ operating system as marketed by Microsoft Corporation of Redmond, Wash.; (d.) a GALAXY NEXUS™ smart phone as marketed by Samsung Group of Seoul, Republic of Korea and running an ANDROID™ operating system as marketed by Google, Inc. of Mountain View, Calif.; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable computational system or electronic communications device known in the art.

A bi-directional internal communications bus 2F communicatively couples and provides electrical power to the processor module 2A with the memory module 2B, the network interface 2C, the data input module 2D, the data output modules 2E and the target circuit T.

The data input modules 2D may be or comprise a computer keyboard, a computer mouse, a point and click selection device, a track ball, a mouse pad, an external disk drive module, a memory stick and/or other suitable user input or data input devices known in the art. The data output modules 2E may be or comprise a display device having a display screen, a touch screen, a portable memory module and/or other suitable data output devices known in the art.

The network interface 2C is adapted to bi-directionally communicatively couple the computer 2 with an electronic communications network 3, such as the Internet, a computer network and/or a telephony network. It is understood that the network interface 2C may be adapted to provide wireless bi-directional communication between the computer 2 and the electronic communications network 3.

The system memory 2B stores an operating system SW.1, a first system software SW.2, a compiler SW.3, an originating ordered list of software coded instructions L (hereinafter, "the ordered list" L) comprising a sequence of software coded machine-executable instructions 4000-4999 SEQ, and a plurality C of software constructs C.01-C.N.

The operating system SW.1 directs the operations of computer 2, controlling and scheduling the execution of other programs, and managing storage, input/output actions, and communication resources, and may be or comprise a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7 ™ operating system as marketed by Microsoft Corporation of Redmond, Wash.; a MAC OS X operating system or iPhone G4 OS™ operating system as marketed by Apple, Inc. of Cupertino, Calif.; or an other suitable operating system known in the art.

The first system software SW.2 provides machine executable instructions 4000-4999 SEQ to cause and enable the computer 2 to instantiate the aspects of the invented method as disclosed herein. The ordered list L is an ordered list of software coded instructions that includes the sequence of software coded machine-executable instructions 4000-4999 SEQ (hereinafter, "sequence" SEQ) upon which one or more aspects of the invented method may be applied by the computer 2 to generate each of the plurality of resultant software coded constructs C.01-C.N (hereinafter, "constructs" C.01-C.N), wherein neither the ordered list L nor the sequence SEQ include software instruction that generate overlapping logic branching. It is understood that the term "source program" as used within the present disclosure indicates machine-executable software code and does not refer to higher-level source code programs or source programming languages.

Figure 2:
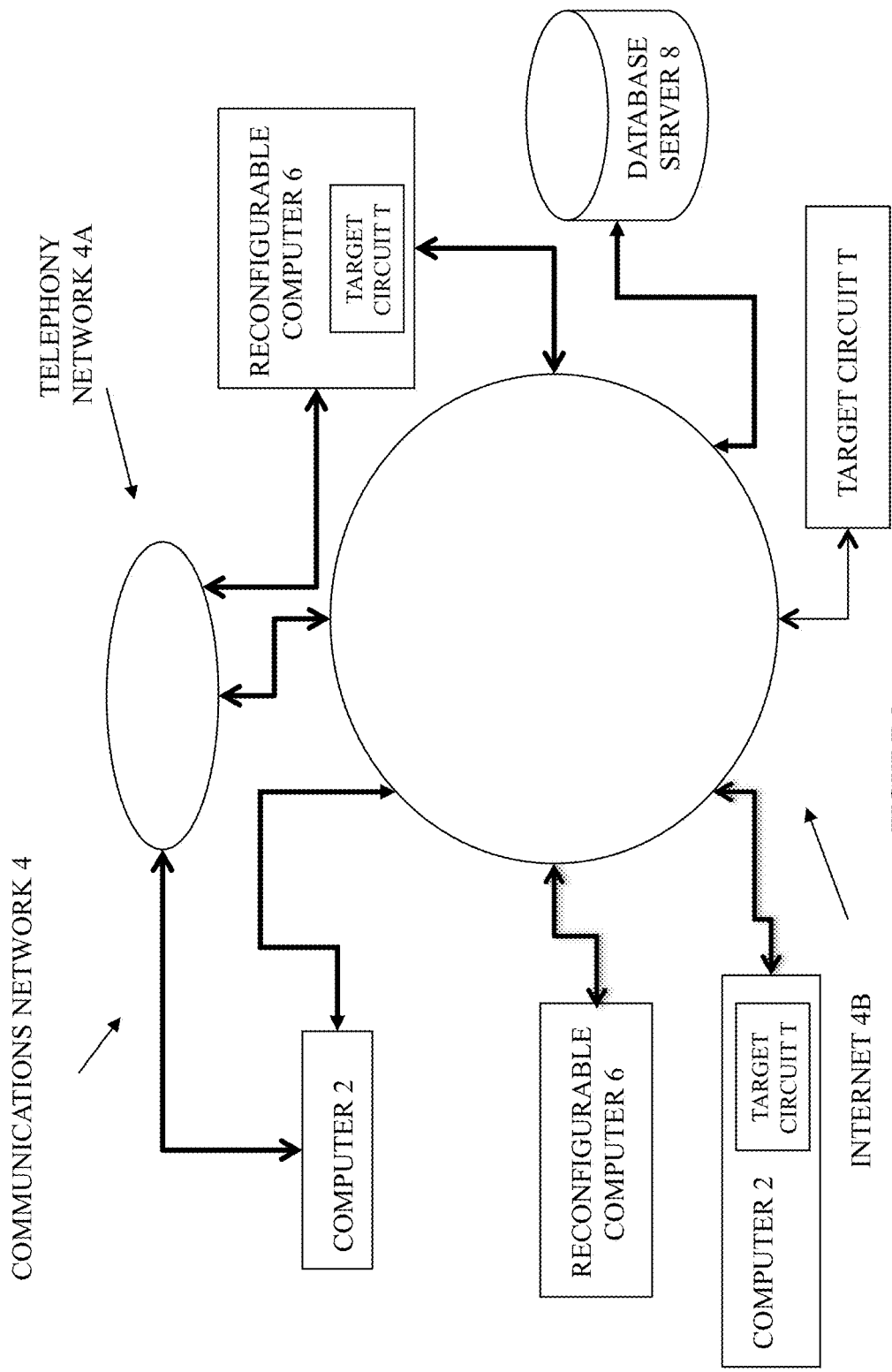
FIG. 2 is an information technology network that comprises at least one prior art computational device of FIG. 1 and a dynamically reconfigurable processor.

Referring now generally to the Figures and particularly to FIG. 2, FIG. 2 is a block diagram of the electronics communications network 4 (hereinafter "network" 4) that comprises the computer 2, a dynamically reconfigurable processor 6, a database server 8 and/or the target circuit T. The network 4 is an information technology network that may additionally comprise a telephony network 4A and/or the Internet 4B.

One or more computers 2, reconfigurable computers 6, and database servers 8 may comprise one or more elements 2A-2E & T or aspects of the computer 2. It is understood that one or more of the aspects of the invented method may be executed in singularity, in concert, or in combination by one or more computer 2, reconfigurable computer 6 and/or database server 8. It is further understood that one or more target circuits T, reconfigurable computers 6 and/or database servers 8 may be or comprise (a.) an IPHONE™ cellular telephone as marketed by Apple, Inc. of Cupertino; (b.) an IPAD™ tablet computer adapted for generation of digitized photographic documents and capable of bi-directional communications via the telephony network and the Internet as marketed by Apple, Inc. of Cupertino, Calif.; (c.) an HTC TITAN II™ cellular telephone as marketed by AT&T, Inc, of Dallas; TX and running a WINDOWS 7 ™ operating system as marketed by Microsoft Corporation of Redmond, Wash.; (d.) a GALAXY NEXUS™ smart phone as marketed by Samsung Group of Seoul, Republic of Korea and running an ANDROID™ operating system as marketed by Google, Inc. of Mountain View, Calif.; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable computational system or electronic communications device known in the art.

The reconfigurable computer 6 may be or comprise a configurable circuit array as disclosed and enabled in Nonprovisional patent application Ser. No. 13/301,763, or other suitable configurable, programmable, reconfigurable and/or reprogrammable processing device or circuit known in the art.

It is further understood that computer 2, reconfigurable computer 6 and/or database server 8 may be applied to derive or generate one or more pluralities C of constructs C.01-C.N by the application of various aspects of the invented method from the one or more ordered lists L and opcode sequences SEQ.

Figure 3:
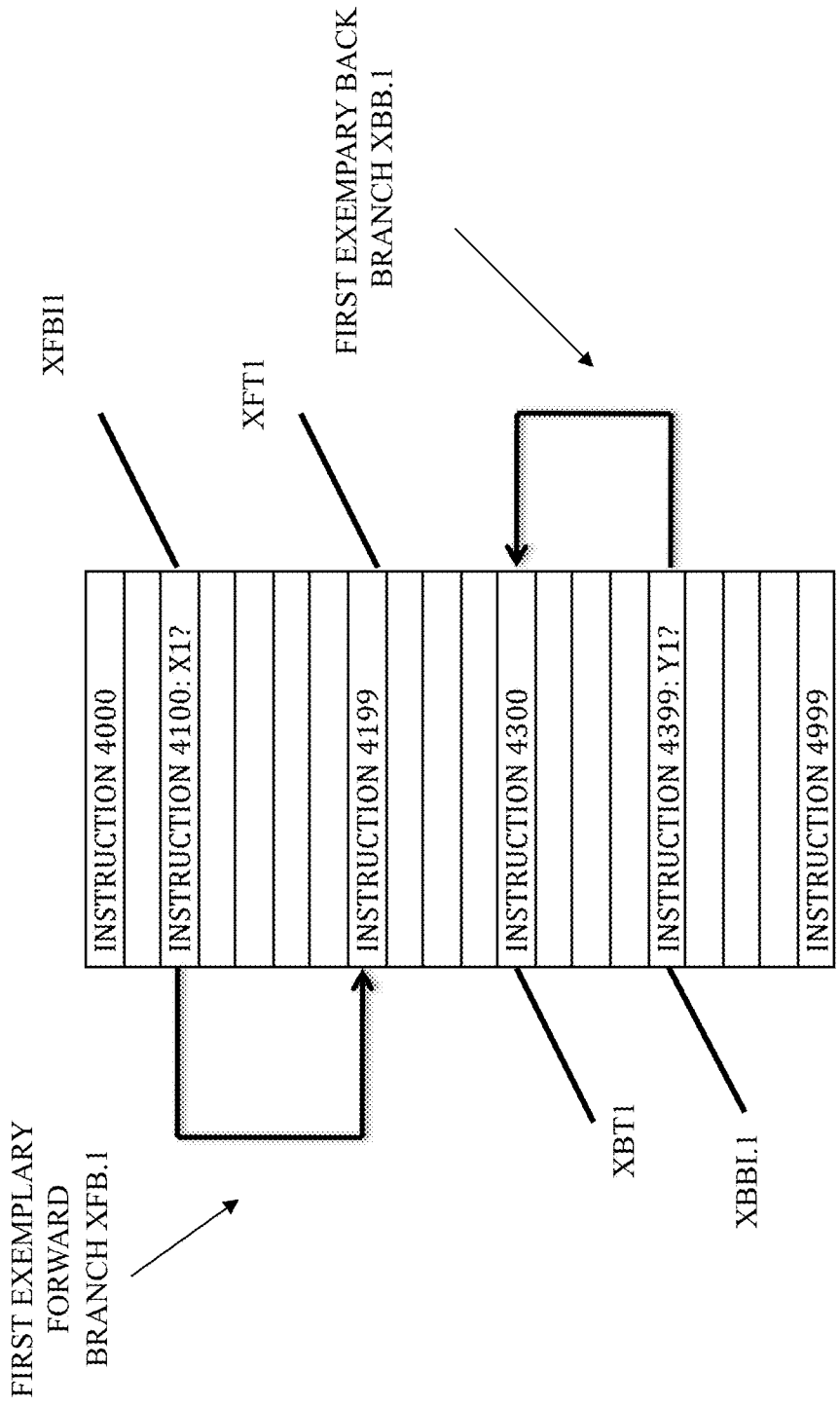
FIG. 3 is a representation of a sequential listing of software-coded, machine-executable instructions that comprise or are provided within a selected sequence of a source software program or a resultant program as disclosed within.

Referring now generally to the Figures and particularly to FIG. 3, FIG. 3 is an illustration of the representative sequence SEQ that includes a plurality of software-coded, machine-executable instructions 4000-4999 SEQ that are comprised and ordered within the ordered list L. It is understood that ordered list L and/or the sequence SEQ may be or comprise a sequentially ordered listing of associated and software objects or other software coded instructions.

The executable instructions 4000-4999 SEQ are ordered for sequential execution starting at a first instruction 4000 and proceeding through the execution of intervening instructions 4001 through 4998 until the execution of a last instruction 4999, wherein branch operations can cause the processor module 2A or target circuit T to not execute certain instructions 4000-4999 SEQ and/or to repeatedly execute certain instructions 4000-4999 SEQ.

It is understood that the term "descending order" is defined herein to denote executing, instantiating, analyzing, processing or examining the instructions 4000-4999 SEQ in sequential order starting at the first instruction 4000 and proceeding to the last instruction 4999.

It is also understood that the term "ascending order" is defined herein to denote executing, instantiating, analyzing, processing or examining the instructions 4000-4999 SEQ in sequential order opposite form the intended order of execution starting at the last instruction 4999 and proceeding to the first instruction 4000.

It is further understood that exemplary first forward branch XFB.1 and exemplary first back branch XBB.1 can be applied by the computer 2 to direct the processor module 2A to alternately (a.) skip over and not execute certain instructions; or (b.) to repeat an execution of certain instructions. For example, a first exemplary forward branch conditional logical query XFBI1 of the instruction 4100 directs the processor module 2A to proceed from executing step 4100 to step 4199 when a logical condition or value of X1 is determined to exist at the instant execution of step 4100. The term "instant" is used herein in its commonly intended sense to refer to a current or immediate exemplary software or hardware that is a focus of explanatory and illustrating comments offered to present examples of various aspects, optional, essential or alternative, of the invented method or invented system.

Logical instructions 4101 to 4199 are thus not executed by the computer 2 when the processor module 2A finds in an execution of instruction 4100 that a logical condition X1 exists, but rather the computer 2 proceeds to execute instruction 4199, i.e., forward target label 4199, as a next executed instruction after the instant execution of step 4100.

The term "forward branch instruction" is defined herein to denote a software coded conditional logical query or test wherein a determination by the executing computer 2 or 4 of a condition or value directs the computer 2 or the reconfigurable computer 4 to proceed from the instant instruction to a forward target label, e.g., instruction 4199, without executing all instructions of comprising the ordered list L or the sequence SEQ intervening between the instant exemplary forward branch instruction XFBI1 and an associated exemplary forward target label XFT1.

It is further understood that a back branch conditional logical query or test of the first exemplary back branch instruction XBBI1 located within instruction 4399 directs the processor module 2A to proceed from executing back branch instruction 4399 to executing an instruction 4300 associated with an exemplary back target label XBT1 when the processor module 2A finds in an execution of instruction 4399 that a pre-specified logical condition exists. According to the exemplary first back branch instruction XBBI1, the processor module 2A proceeds from instruction 4399 to execute instruction 4300 when a logical condition Y1 is met in the execution of instruction 4399 that is associated with the first back branch instruction XBBI1.

The term "back branch instruction" is defined herein to denote a software coded conditional logical query or test wherein a determination of a condition or value directs the computer 2 or the reconfigurable computer 4 to proceed from processing the instant back branch instruction, e.g., instruction 4399, to next executing a back target label XBT1, e.g., the back target label XBT1 associated with instruction 4300.

It is still further understood that one or more conditional logical queries or tests X1 or Y1 may be a negative query or test, wherein a determination of a nonexistence of a specified logical condition or value at the time of execution of the instant branch instruction XFBI.1 & XBBI.1 will lead to a positive finding of the query or test and thereby result in an activation of an associated back branch XBB.1 or a forward branch XFB.1.

The term "back branch instruction" is defined herein to denote a conditional logical query or test wherein a positive finding directs the computer 2 or the reconfigurable computer 6 to proceed from an instant back branch instruction, e.g., instruction 4399, to a back target label, e.g., instruction 4300, wherein the back target label is located previous to the instant back branch instruction in the instruction sequence of instructions 4000-4999 SEQ.

It is understood that the terms "target" and "target label" as used herein indicate software code 4199 & 4300 within the instruction sequence 4000-4999 SEQ to which a computer 2 or 4 next references or executes after the execution of a branch instruction 4100 & 4399 as determined by the host computer 2 or 4.

Figure 4:
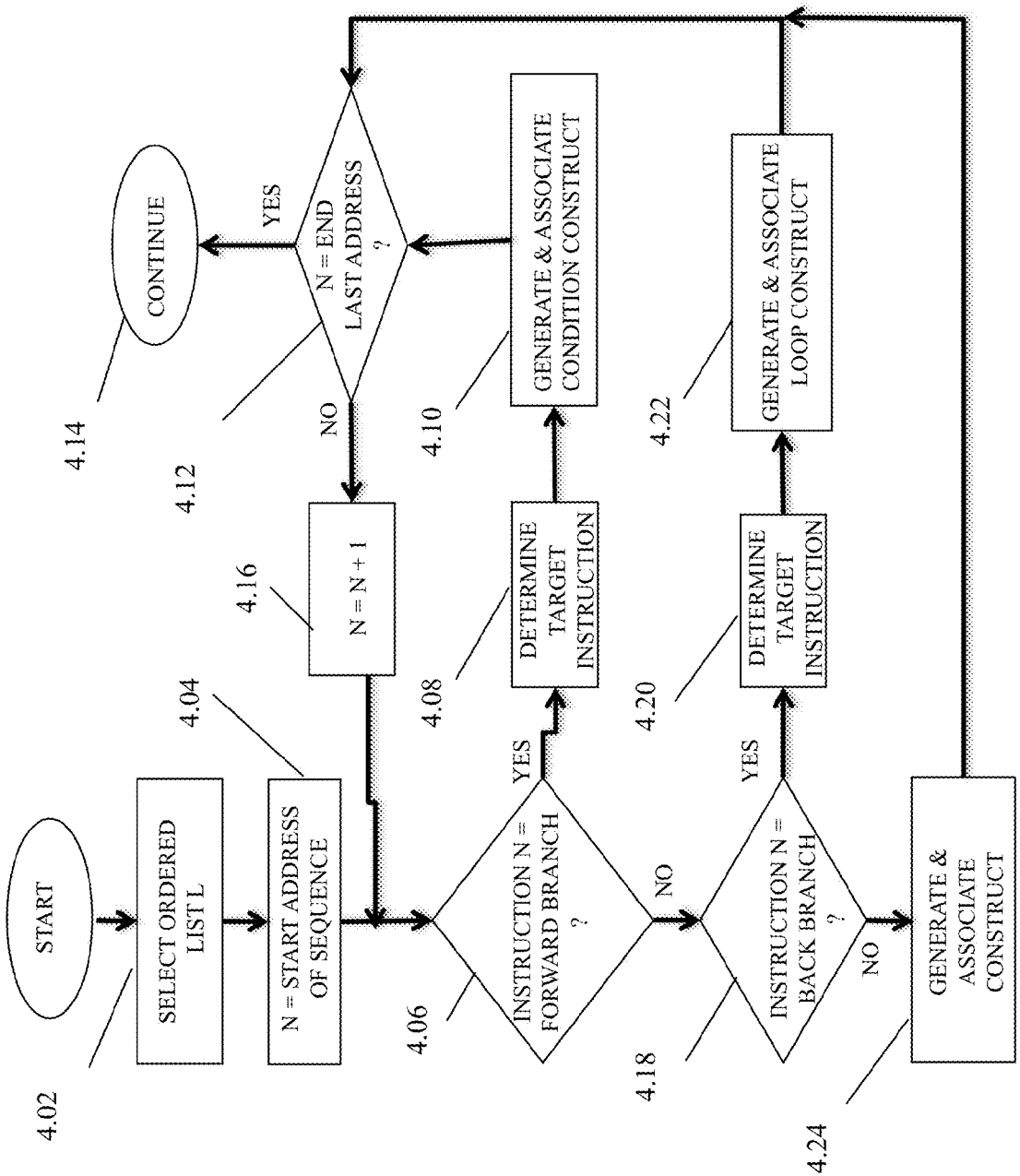
FIG. 4 is a flow chart of certain aspects of the invented method that a first system software may optionally include and that are executable by the computer of FIG. 1.

Referring now generally to the Figures and particularly to FIG. 4, FIG. 4 is a flow chart of certain aspects of the invented method that the first system software SW.2 may optionally include and that are executable by the computer 2. The ordered list L is selected in step 4.02 and a counter N is initialized to be equal to the address of a first instruction 4000 within the sequence SEQ. The processor 2A then determines in step 4.06 whether the instruction of the sequence SEQ at the address N within the sequence SEQ is a conditional forward branch instruction. When the processor 2A determines in step 4.06 that the instruction of the sequence SEQ at the address N within the sequence SEQ is a conditional forward branch instruction, the processor 2A proceeds to step 4.08 and to determine a target instruction of the sequence SEQ to which the instant conditional forward branch instruction located at address N conditionally directs code execution flow. The processor 2A then proceeds from step 4.08 to step 4.10 and to generate a condition construct C.01-C.N, wherein the condition construct provides an equivalent logic to the instant forward branch instruction of step 4.08, wherein a machine-executable instruction and all dependencies of the instant forward branch instruction are replicated by a combination of logic of the condition construct C.01-C.N and association of the condition construct C.01-C.N with other constructs C.01-C.N. The processor 2A proceeds from step 4.10 to step 4.12 and to examine the value of the counter N to determine whether the value of the counter N is equal to the last instruction address 4999 of the sequence SEQ. When the processor 2A determines in step 4.12 that the value of the counter N is equal to or greater than the last instruction address 4999 of the sequence SEQ, the computer 2 proceeds on to step 4.14 and to perform additional computational operations. Alternatively, when the processor 2A determines in step 4.12 that the value of the counter N is not equal to or greater than the last instruction address 4999 of the sequence SEQ, the computer 2 proceeds on to step 4.14 to step 4.16 and to increment the counter N. The processor 2A proceeds from step 4.16 to an additional execution of step 4.06.

When the processor 2A determines in step 4.06 that the instruction of the sequence SEQ at the address N within the sequence SEQ is not a conditional forward branch instruction, the processor 2A proceeds to step 4.18 and to determine whether the instruction of the sequence SEQ at the address N within the sequence SEQ is a conditional back branch instruction.

When the processor 2A determines in step 4.18 that the instruction of the sequence SEQ at the address N within the sequence SEQ is a conditional back branch instruction, the processor 2A proceeds to step 4.20 and to determine a target instruction of the sequence SEQ to which the instant back branch instruction located at address N conditionally directs code execution flow. The processor 2A then proceeds for step 4.20 to step 4.22 and to generate a loop construct C.01-C.N, wherein the loop construct provides an equivalent logic to the instant conditional back branch instruction of step 4.08, wherein a machine-executable instruction and all dependencies of the instant forward branch instruction are replicated by a combination of logic of the loop construct C.01-C.N and association of the condition construct C.01-C.N with other constructs C.01-C.N. The processor 2A proceeds from step 4.22 to step 4.12 and to examine the value of the counter N to determine whether the value of the counter N is equal to the last instruction address 4999 of the sequence SEQ.

Alternatively, when the processor 2A determines in step 4.18 that the instruction of the sequence SEQ at the address N within the sequence SEQ is not a conditional back branch instruction, the processor 2A proceeds to step 4.24 and to generate a construct C.01-C.N, wherein the construct provides an equivalent logic to the instant instruction located at address N within the sequence SEQ, wherein a machine-executable instruction and all dependencies of the instant instruction are replicated by a combination of logic of the generated construct C.01-C.N and association of the generated construct C.01-C.N with other constructs C.01-C.N. The processor 2A proceeds form step 4.24 to step 4.12.

Figure 5:
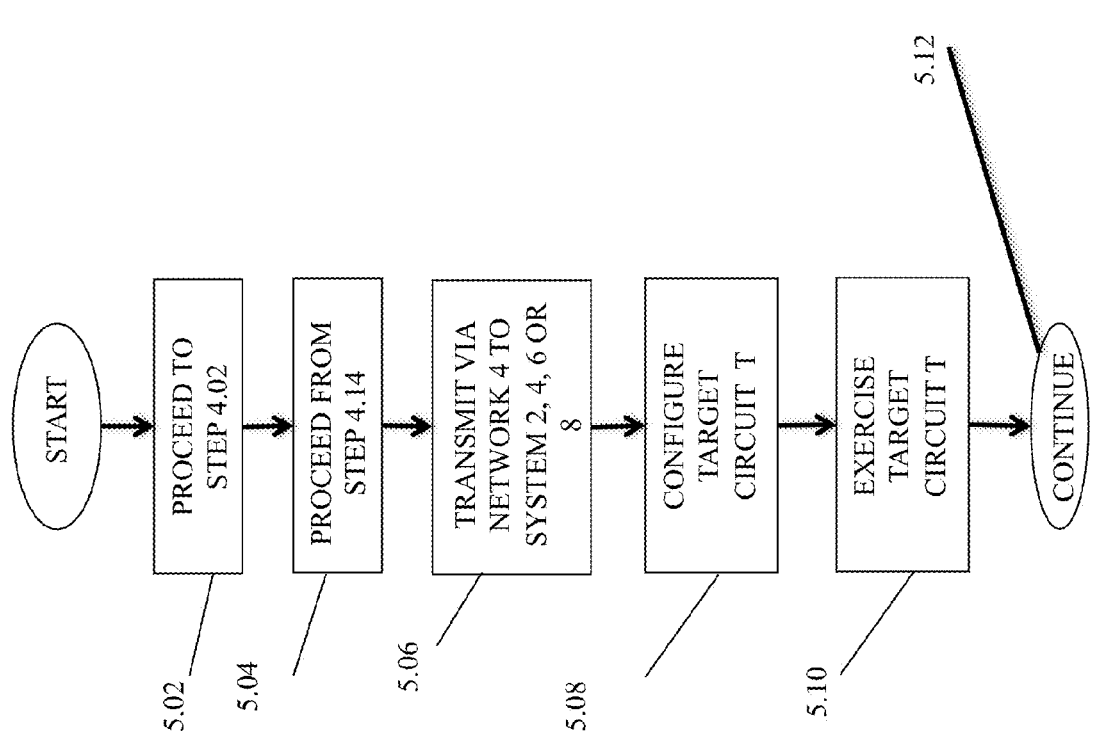
FIG. 5 is a flowchart of additional optional computational processing executable by the computer of FIG. 1.

Referring now generally to the Figures and particularly to FIG. 5, FIG. 5 is a flowchart of additional optional computational processing executable by the computer 2, wherein at step 5.02 and step 5.04 the computer 2 executes the instructions of step 4.02 through step 4.14. In optional step 5.06 the plurality of constructs C.01-C.N generated in steps 4.02 through 4.14 are communicated by electronic media or by electronic messaging via the network 4 to an alternate computer 2, reconfigurable computer 6, database server 8 or target circuit T. The target circuit T is configured in step 5.08 in accordance with the plurality of constructs C.01-C.N and the target circuit T is exercised in step 5.10 as configured in step 5.08. The computer 2 proceeds from step 5.10 on to step 5.12 and to perform additional computational operations.

Figure 6:
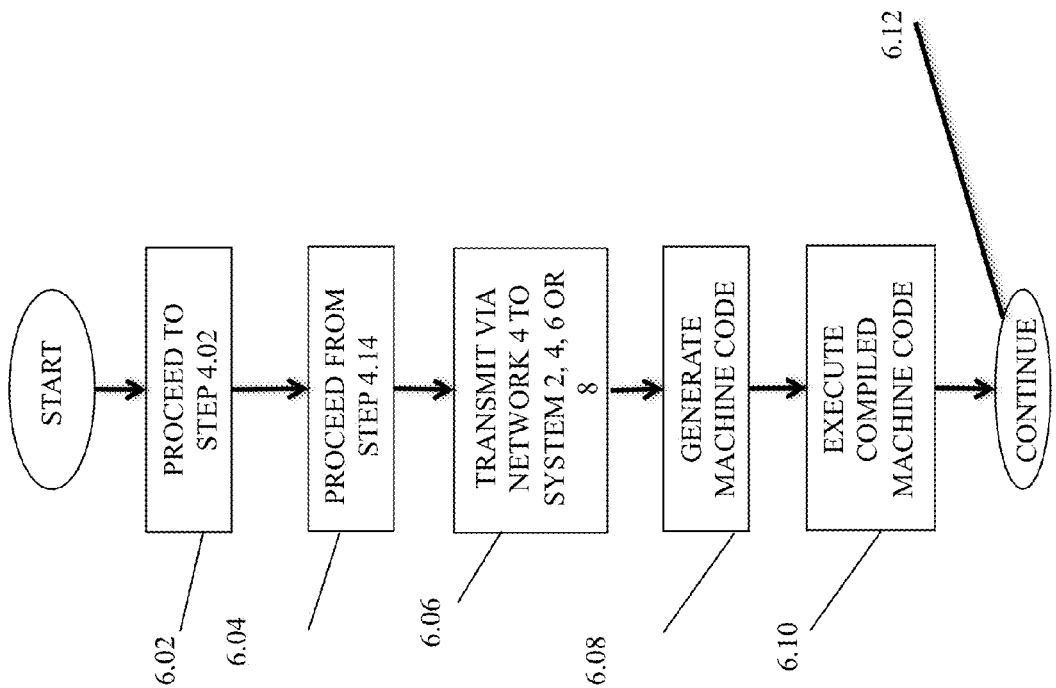
FIG. 6 is a flowchart of still additional optional computational processing executable by the computer of FIG. 1.

Referring now generally to the Figures and particularly to FIG. 6, FIG. 6 is a flowchart of still additional optional computational processing executable by the computer 2, wherein in step 6.02 and step 6.04 the computer 2 executes the instructions of step 4.02 through step 4.14. In optional step 6.06 the plurality of constructs C.01-C.N generated in steps 4.02 through 4.14 are communicated by electronic media or by electronic messaging via the network 4 to an alternate computer 2, reconfigurable computer 6, database server 8 or target circuit T. The compiler SW.3 is applied to the plurality of constructs C.01-C.N in step 6.08 to a generate machine-executable code SW.M derived from the plurality of constructs C.01-C.N, and the machine executable code SW.M is executed in step 6.10 at least partially by the target circuit T. The computer 2 proceeds from step 6.10 on to step 6.12 and to perform additional computational operations.

It is understood that the machine-executable code SW.M may be expressed in the VERILOG™ programming language and that the alternate computer 2, reconfigurable computer 6, database server 8 or target circuit Target circuit may be or comprise a programmable circuit, such as a VIRTEX-7™ field programmable gate array as marketed by Xilinx Corporation of San Jose, Calif., a STRATIX V™ field programmable gate array as marketed by Altera Corporation of San Jose, Calif., and/or other suitable programmable devices known in the art.

As one illustrative example, the machine code SW.M might be written in the VERILOG™ software language and in step 6.10 the VERILOG machine code SW.M may be used to program a VIRTEX-7™ field programmable gate array as marketed by Xilinx Corporation of San Jose, Calif., a STRATIX V™ field programmable gate array as marketed by Altera Corporation of San Jose, Calif., and/or other suitable programmable devices known in the art. It is understood that logical structure of the VERILOG machine code SW.M may be reduced to, an embodied within, an applications specific integrated circuit using the suitable proprietary tools of Xilinx Corporation or Altera Corporation, or other suitable ASIC generation tools known in the art.

Figure 8:
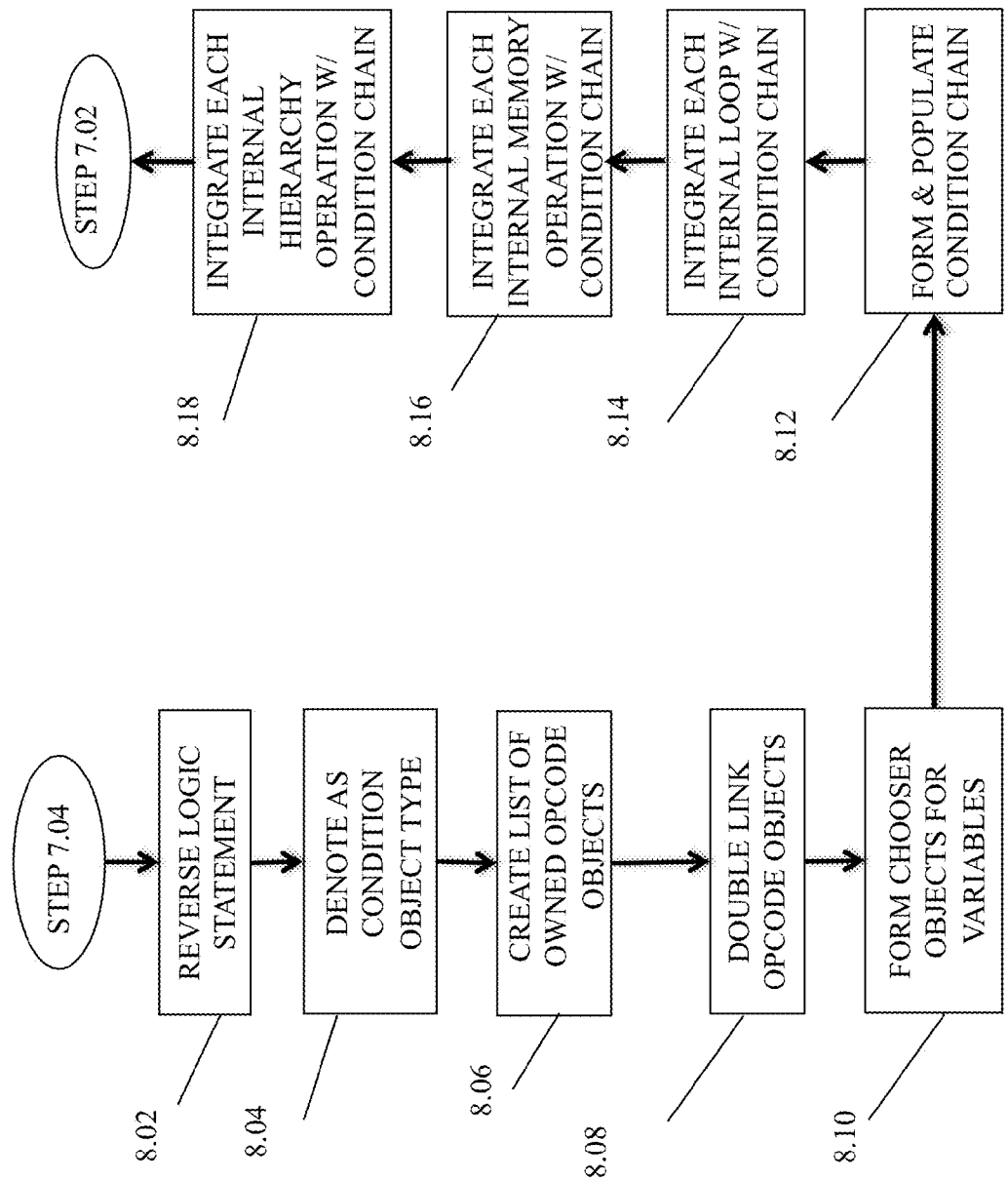
FIG. 8 is a flowchart of an instance of an aspect of the process of FIG. 7 wherein the logic and flow of a forward branch logic as expressed by the ordered list of software objects is replicated by a plurality of non-linearly ordered software objects.
Figure 9:
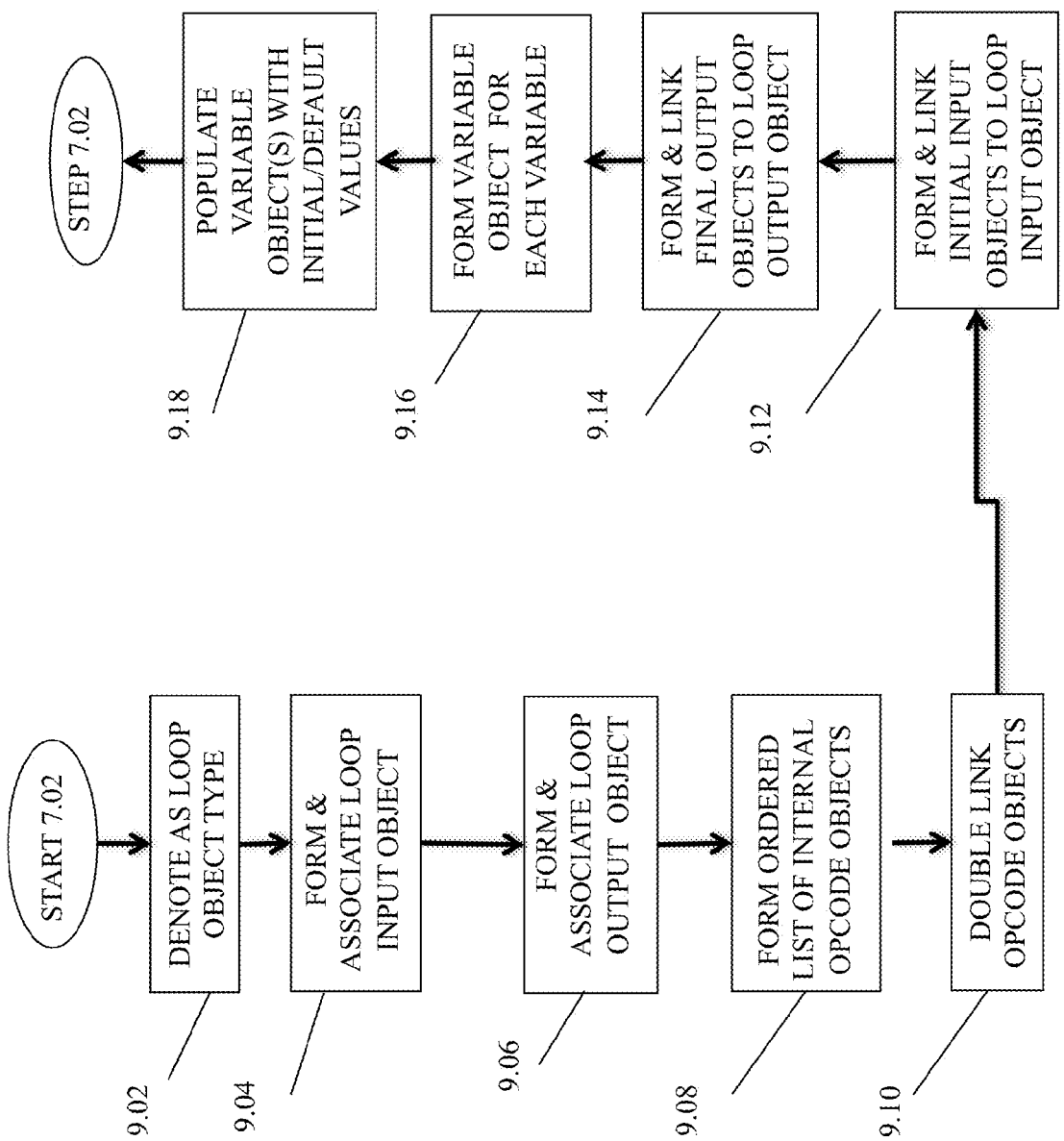
FIG. 9 is a flowchart of an instance of an aspect of the process of FIG. 7 wherein the logic and flow of a back branch logic as expressed by the ordered list of software objects is replicated by a plurality of non-linearly ordered software objects.

Referring now generally to the Figures and particularly to Figures and particularly to FIGS. 7, 8, and 9, the ordered list L and the plurality of constructs C.01-C.N will be discussed and viewed as software objects for the purposes of illustration of certain aspects of the invented method. It is understood that this discussion, analysis and treatment of the ordered list L and the plurality of constructs C.01-C.N as software objects in the explanations of FIGS. 7, 8 and 9 are not limiting but are merely a presentation of a preferred embodiment of the invented method.

Figure 7:
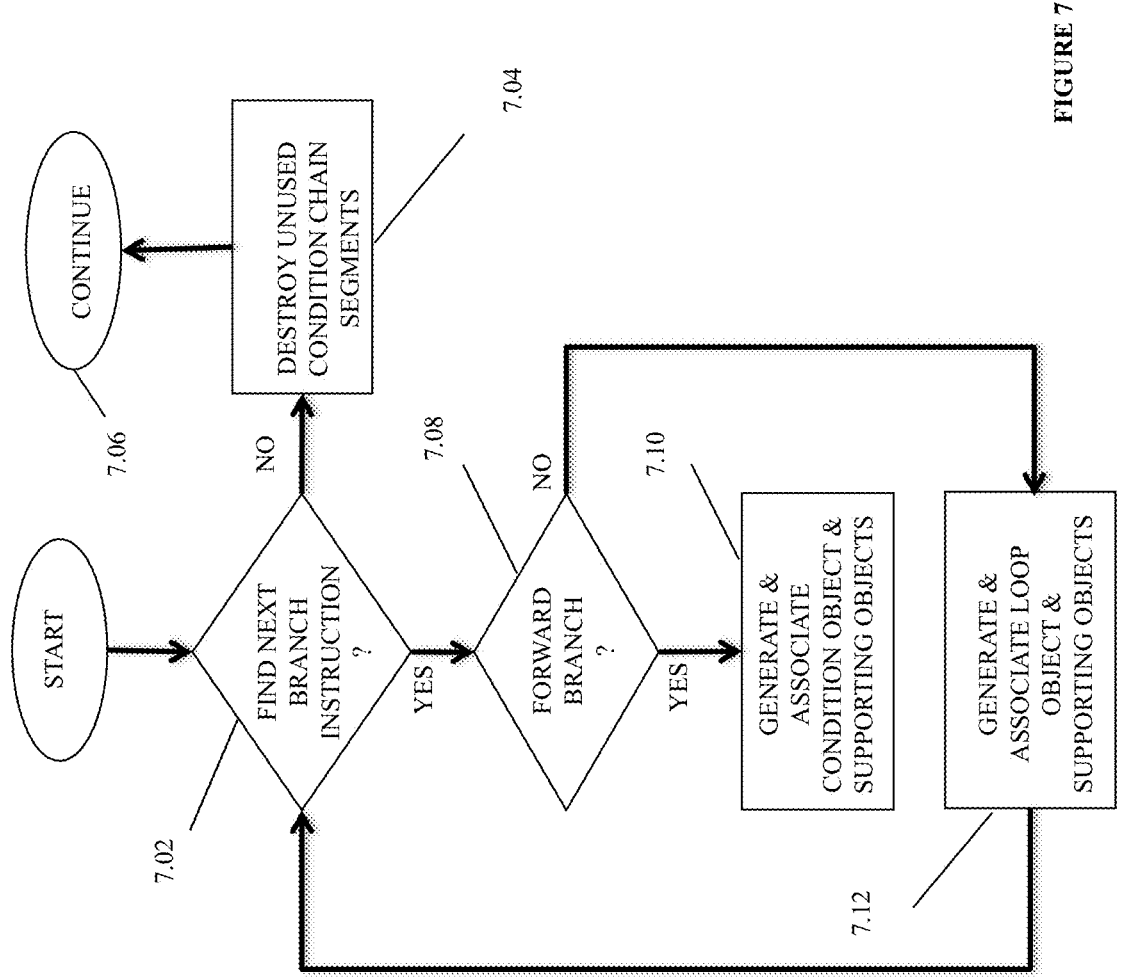
FIG. 7 is a flowchart of an embodiment of the invented method wherein an ordered list of software objects that each optionally include an opcode into a non-linearly ordered plurality of software objects that are associated to replicate the process and logic of the ordered list of software objects.

Referring now generally to the Figures and particularly to FIG. 7, FIG. 7 is a flow chart of an alternate process executable by the computer 2 and including one or more aspects of the invented method that optionally may be employed within a process of a conversion of the ordered list L into the plurality of constructs C.01-C.N, wherein the sequence SEQ of the ordered list L is an ordered list of software objects as directed by the first system software SW.2 and the compiler SW.3 and each of the plurality of constructs C.01-C.N are software objects. In step 7.02 a next branch object in descending order within the sequence SEQ is sought by the processor 2A. At this point in the operation of the compiler SW.3, all branches are all nested to arbitrary depth, and conversion from instructions 4000-4999 to constructs C.01-C.N is sequentially processed from outermost nested branch to an innermost nested branch at all points in the sequence SEQ. Alternatively, the conversions from of branch instruction of the instructions 4000-4999 can be done in any order, but after conversions, the condition constructs C.01-C.N referred to herein are resorted so that the conditions appearing in each of these conditions constructs C.01-C.N is in order from each outermost condition construct C.01-C.N to each enclosed innermost condition construct C.01-C.N.

When no further branch instruction, e.g., branch object, of the order list L is found after the last examined instruction 4000-4998 and the last instruction 4999 of the sequence SEQ, the processor 2A proceeds on to step 7.04 and to destroy all unused condition chain segments. Condition chains are structures built to combine all conditions that affect a predicated operation of a construct C.01-C.N into a single condition equation, and thereby transform execution dependency logic into data dependency logic. It is understood that the compiler SW.3 builds these condition chain structures for each condition construct C.01-C.N even though particular condition chains might not be used when an instant condition construct C.01-C.N does not contain any nested loops or memory operations; wherein condition chains should be destroyed when they are not needed. The processor 2A proceeds from step 7.04 to step 7.06 to perform alternate computational processing.

An exemplary instance of generating a data dependency logical statement or equation from an execution dependency logical statement or statement is now provided. Consider the following software program written in the C programming language:

```
int main( )
{
    int   x = getchar( );
    int   y = getchar( );
    int   z = getchar( );
    if( x == 'a' )
    {
        putchar( 'u' );
        if( y == 'b' )
        {
            putchar( 'v' );
            if( z == 'c' )
                putchar( 'w' );
        }
    }
    putchar( '\n' );
    return 0;
}
```

This exemplary C program includes dependencies that are based upon an execution of a previous command or instruction of the ordered list of instructions L, i.e., this exemplary C program exhibits execution dependencies. The compiler SW.3 might accept the exemplary C program and generate the following low level virtual machine byte code:

```
internal int %main( ) {
entry:
    %tmp = call int (...)* %getchar( )    ; <int> [#uses=1]
    %tmp1 = call int (...)* %getchar( )   ; <int> [#uses=1]
    %tmp2 = call int (...)* %getchar( )   ; <int> [#uses=1]
    %tmp = seteq int %tmp, 97       ; <bool> [#uses=1]
    br bool %tmp, label %cond_true, label %cond__next16
cond_true:      ; preds = %entry
    %tmp422 = call int %putchar( int 117 )    ; <int> [#uses=0]
    %tmp6 = seteq int %tmp1, 98     ; <bool> [#uses=1]
    br bool %tmp6, label %cond_true7, label %cond__next16
cond_true7:     ; preds = %cond_true
    %tmp821 = call int %putchar( int 118 )    ; <int> [#uses=0]
    %tmp10 = seteq int %tmp2, 99    ; <bool> [#uses=1]
    br bool %tmp10, label %cond_true11, label %cond__next16
cond_true11:    ; preds = %cond_true7
    %tmp1220 = call int %putchar( int 119 )    ; <int> [#uses=0]
    br label %cond__next16
cond__next16:   ; preds = %cond_true11, %cond_true7, %cond_true, %entry
    %tmp17.19 = call int %putchar( int 10 )    ; <int> [#uses=0]
    ret int 0
}
```

The compiler SW.3 would then derive from the exemplary LLVM byte code the following exemplary unordered software object list of the plurality of constructs C.01-C.N:

```
1 { /* main */
    0 { PASS   0 - { } { } /*  */ }
    1 { TRUNC  0 - { 0 } { } /*  */ }
    2 { GLOBAL  4 - { 3 } { } /*  */ }
    3 { GLOBAL  4 - { 4 } { } /*  */ }
    4 { GLOBAL  4 - { 5 } { } /*  */ }
    5 { IN    6 - { 1 2 } { } /*  */ }
    6 { PARAM  4 2 { 5 } { 17 } /* 1 * / }
```

-continued

```
 7 { PARAM    0 0 { 5 } { 17 } /* 0 */ }
 8 { PI       0 - { 7 9 } { 17 } /* */ }
 9 { VLOAD    1 - { 6 8 } { 17 } /* tmp.i*/ }
10 { UEXTEND  4 - { 9 } { 17 } /* tmp6.i */ }
11 { CONST    4 1 { 5 } { 17 } /* */ }
12 { AND      4 - { 10 11 } { 17 } /* tmp2.i */ }
13 { CONST    4 0 { 5 } { 17 } /* */ }
14 { SETEQ    1 - { 12 13 } { 17 } /* tmp.i */ }
15 { CHOOSER 1 - { 14 14 14 } { 17 } /* */ }
16 { OUT      4 - { 15 9 } { 17 } /* */ }
17 { LOOP     0 - { 5 16 } { 17 } /* */ }
18 { PARAM    1 2 { 16 } { } /* 1 */ }
19 { VLOAD    1 - { 3 18 } { } /* tmp4.i */ }
20 { IN       6 - { 19 2 } { } /* */ }
21 { PARAM    4 2 { 20 } { 32 } /* 1 */ }
22 { PARAM    1 0 { 20 } { 32 } /* 0 */ }
23 { PI       0 - { 22 24 } { 32 } /* */ }
24 { VLOAD    1 - { 21 23 } { 32 } /* tmp.i11 */ }
25 { UEXTEND  4 - { 24 } { 32 } /* tmp6.i12 */ }
26 { CONST    4 1 { 20 } { 32 } /* */ }
27 { AND      4 - { 25 26 } { 32 } /* tmp2.i13 */ }
28 { CONST    4 0 { 20 } { 32 } /* */ }
29 { SETEQ    1 - { 27 28 } { 32 } /* tmp.i14 */ }
30 { CHOOSER 1 - { 29 29 29 } { 32 } /* */ }
31 { OUT      4 - { 30 24 } { 32 } /* */ }
32 { LOOP     0 - { 20 31 } { 32 } /* */ }
33 { PARAM    1 2 { 31 } { } /* 1 */ }
34 { VLOAD    1 - { 3 33 } { } /* tmp4.i16 */ }
35 { IN       6 - { 34 2 } { } /* */ }
36 { PARAM    4 2 { 35 } { 47 } /* 1 */ }
37 { PARAM    1 0 { 35 } { 47 } /* 0 */ }
38 { PI       0 - { 37 39 } { 47 } /* */ }
39 { VLOAD    1 - { 36 38 } { 47 } /* tmp.i2 */ }
40 { UEXTEND  4 - { 39 } { 47 } /* tmp6.i3 */ }
41 { CONST    4 1 { 35 } { 47 } /* */ }
42 { AND      4 - { 40 41 } { 47 } /* tmp2.i4 */ }
43 { CONST    4 0 { 35 } { 47 } /* */ }
44 { SETEQ    1 - { 42 43 } { 47 } /* tmp.i5 */ }
45 { CHOOSER 1 - { 44 44 44 } { 47 } /* */ }
46 { OUT      4 - { 45 39 } { 47 } /* */ }
47 { LOOP     0 - { 35 46 } { 47 } /* */ }
48 { PARAM    1 2 { 46 } { } /* 1 */ }
49 { VLOAD    1 - { 3 48 } { } /* tmp4.i7 */ }
50 { CONST    1 97 { } { } /* */ }
51 { SETEQ    1 - { 19 50 } { } /* tmp */ }
52 { COND     0 - { 51 } { } /* */ }
53 { CONST    1 117 { } { 52 } /* */ }
54 { CVSTORE 1 - { 53 4 51 49 } { 52 } /* */ }
55 { CONST    1 98 { } { 52 } /* */ }
56 { SETEQ    1 - { 34 55 } { 52 } /* tmp9 */ }
57 { AND      1 - { 56 51 } { 52 } /* */ }
58 { COND     0 - { 56 } { 52 } /* */ }
59 { CONST    1 118 { } { 58 52 } /* */ }
60 { CVSTORE 1 - { 59 4 57 54 } { 58 52 } /* */ }
61 { CONST    1 99 { } { 58 52 } /* */ }
62 { SETEQ    1 - { 49 61 } { 58 52 } /* tmp14 */ }
63 { AND      1 - { 62 57 } { 58 52 } /* */ }
64 { COND     0 - { 62 } { 58 52 } /* */ }
65 { CONST    1 119 { } { 64 58 52 } /* */ }
66 { CVSTORE 1 - { 65 4 63 60 } { 64 58 52 } /* */ }
67 { CHOOSER 0 - { 62 66 60 } { 58 52 } /* */ }
68 { CHOOSER 0 - { 56 67 54 } { 52 } /* */ }
69 { CHOOSER 0 - { 51 68 49 } { } /* */ }
70 { CONST    1 10 { } { } /* */ }
71 { VSTORE 1 - { 70 4 69 } { } /* */ }
72 { CONST    4 0 { } { } /* */ }
73 { RETURN   4 - { 72 71 } { } /* */ }
}
```

It is understood that the conditional store command on line 54 of the exemplary unordered software object list bears the same conditional logic as the condition on line 52 (51), whereas the conditional store command on line 60 of the exemplary unordered software object list bears the conditional logic of both the condition on line 52 (51) and the condition on line 58 (56); this is a condition chain. Continuing the condition chain of the exemplary unordered software object list, the conditional store on line 66 depends on all three conditions 51, 56, and 62 being true.

Alternatively, if a branch object of the ordered list L is found in step 7.02, the processor 2A determines in step 7.08 whether the branch object contains a forward branch instruction, e.g., a forward branch opcode. When the processor 2A determines in step 7.08 that the branch object contains a forward branch instruction, the processor 2A proceeds on to step 7.10 and to convert the forward branch object into a condition construct C.01-C.N and to form and populate additional constructs C.01-C.M as discussed in FIG. 8 and accompanying text. Optional details of the procedure of step 7.08 of forming a condition construct are disclosed in FIG. 8.

The processor 2A proceeds from step 7.10 back to step 7.02 and to seek an additional branch instruction in a further descending address within the sequence SEQ.

When the processor 2A determines in step 7.08 that the branch object of the ordered list L does not contain a forward branch opcode, the processor 2A proceeds on to step 7.12 and to convert the forward branch object into a loop construct C.01-C.N and to form and populate additional constructs C.01-C.N as discussed in FIG. 9 and accompanying text. Optional details of the procedure of step 7.12 of forming a condition construct are disclosed in FIG. 9.

The processor 2A proceeds from step 7.12 back to step 7.02 and to seek an additional branch instruction in a descending position within the sequence SEQ. Alternatively, when the processor 2A determines in step 7.10 that the instant branch object does not contain a back branch instruction, the processor 2A proceeds back to step 7.02.

FIG. 7 is a flowchart of an embodiment of the invented method wherein an ordered list of software objects L that each optionally include an opcode 4000-4999 into a non-linearly ordered plurality of software objects C.01-C.N that are associated to replicate the process and logic of the ordered list of software objects L.

Referring now to FIG. 8, FIG. 8 is a flowchart of an instance of an aspect of the process of FIG. 7 of step 7.10 wherein the logic and flow of a forward branch logic as expressed by the ordered list of software objects L is replicated by a plurality of non-linearly associated software objects C.01-C.N.

In an exemplary application of step 7.10, steps 8.02 through 8.18 are applied to the forward branch logic loop of instructions 4100-4199.

In the step 8.02 the forward branch logic statement "X1?" of the exemplary forward branch instruction 4100 is reversed to a branch logic statement "NOT X1?" in order to convert the logic of the forward branch instruction 4100 from "conditional area skipped if true" to "conditional area executed if true" to support predication structures of the plurality of constructs C.01-C.N that are built to replicate the logic and flow of the instructions 4100-4199 within the plurality of constructs C.01-C.N.

In step 8.04, a forward branch instruction 4100 is converted into an exemplary condition construct C.02 that is typed as a CONDITION OBJECT. The execution of step 8.04 could optionally or alternatively be anything from (a.) the extremity of replacing the forward branch instruction 4100 with a software object of the condition construct C.02 while retaining pertinent data from the previous object; to (b.) a milder process of changing a property of a more generic opcode object. For the more extreme conversion cases, any new condition object might supply an opcode object interface in order to still be nestable.

In step 8.06 an ordered list of instructions objects 4101-4199 owned by the first forward instruction object 4100 of all opcodes and instruction objects 4100-4199 located inside the conditional area of instruction objects 4101-4199 is created. This ordered list of instruction objects 4101-4199 enables the processor 2A to determine what instructions, e.g., opcode objects, are affected by the condition construct C.02.

In optional step 8.08 a reference is added with each opcode instruction 4101-4199 of the conditional area of the forward branch object 4100, whereby each opcode condition object 4101-4199 is double linked to the forward branch construct object C.02.

In step 8.10, for each variable modified inside the conditional area of the exemplary condition construct C.02, a chooser object C.C1-C.CN having a CHOOSER type denotation. Each chooser object C.01-C.CN that is devoted to a variable related to the instant forward logic branch loop 4100-4199 is created and inserted outside the conditional area construct object C.02.

A condition chain object C.CC1 is created in step 8.12 and may be associated with the condition construct C.02. Each logic loop nested directly inside the condition construct C.02 is converted into a conditional loop object C.L1-C.LN and the created conditional loop object C.L1-C.LN is then connected to the condition chain object C.CC1 as a condition operand of each conditional loop object C.L1-C.LN in step 8.14 referenced by the condition construct C.02.

Each memory operation nested directly inside the condition construct C.02 is converted in step 8.16 into an analogous conditional memory operation object C.M1-C.MN and the condition chain object C.CC1 is connected as the condition operand of each conditional memory operation object C.M1-C.MN referenced by the condition construct C.02.

In step 8.18 each function call nested directly inside the condition construct C.02 is converted into a hierarchical conditional call object C.HC1-C.HCN and the condition chain object C.CC1 is connected as the condition operand of each hierarchical conditional call C.HC1-C.HCN referenced by the condition construct C.02. The processor 2A proceeds from step 8.18 to step 7.02.

It is understood that the wording "directly inside" means that there are no intervening conditions between dependency of the condition chain object C.CC1 and the objects C.M1-C.MN, C.L1-C.LN & C.HC.1-C.HC.N referenced to the condition chain object C.CC1.

It is understood that in certain preferred embodiments of the invented method, steps 8.14, 8.16 and 8.18 can be applied to each forward branch instruction of the sequence SEQ in question in any order in the generation of the plurality of constructs C.01-C.N.

FIG. 9 is a flowchart of an instance of an aspect of the process of FIG. 7 wherein the logic and flow of a back branch of instructions 4300-4399 as expressed by the ordered list of software objects L is replicated by the compiler SW.3 in step 7.12 by the formation and population of a plurality of non-linearly associated software objects C.01-C.N.

Figure 28:
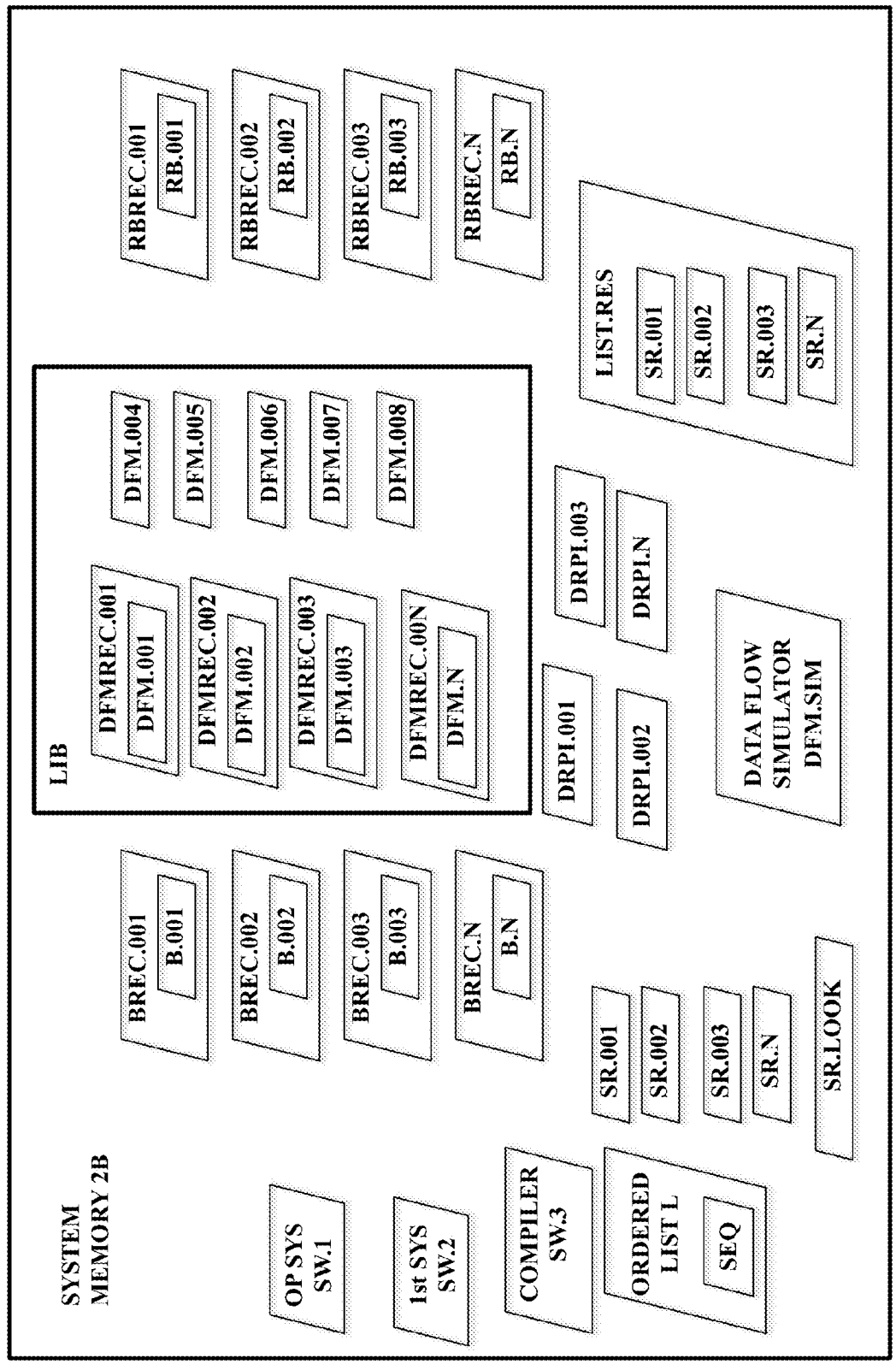
FIG. 28 is a detail illustration of the system memory of FIG. 1 and illustrating the intermediate bubbles, software resources, data flow, models resource listings and resultant bubbles of the method of FIG. 17, FIG. 18 and FIG. 21 through 27.

In step 9.02 the exemplary back branch instruction object 4399 is converted into a loop construct object C.03 by denoting the exemplary back branch instruction object 4399 as being of type LOOP. An associated loop input construct object C.LI.2 is associated at the back branch target object 4300 in step 9.04, and an associated loop output construct object C.LO.2 is associated directly in front of the back branch instruction object 4399. This associated loop output construct object C.LO.2 would be inserted in the ordered list L owned by the function object software construct C.F1. As with the loop construct object C.03, the loop output construct object C.LO.2 must be an opcode object or at least have an opcode object interface. The loop output construct object C.LO.2 is required if the operation of the resulting code of the plurality of constructs C.01-C.N is to be correctly simulated in a data flow simulator DFM.SIM, as represented in FIG. 1 and FIG. 28, in order for data flow in the function at large to be synchronized with specific appropriate iterations of the loop logic of instructions 4300-4399.

In step 9.08 a loop ordered list construct object C.OL.2 containing the logic of the ordered list of instructions 4300-4399 owned by the loop construct C.L3 of all opcode objects inside the instant loop of instructions 4300-4399 is created. This loop ordered list construct object C.OL.2 would be inserted in the ordered list of instruction objects 4300-4399 owned by a function object software construct C.F1. The loop ordered list construct object C.OL.2 enables the processor 2A to determine which loops affect associated loop construct object C.03.

In optional step 9.10, a reference is added with each opcode instruction object 4300-4398 of the loop area of the back branch object 4399, whereby each opcode condition object 4303-4199 is double linked to the back branch construct object C.03.

In step 9.12, each initial input is threaded to the loop object construct C.03 through the loop input object C.LI.1. Here "thread" means add the datum as an operand to the loop input object C.LI.1 and also as an output from the loop object construct C.03 and then connect the construct objects C.01-C.N that use this datum to the newly created output of the loop construct object 4300-4399 rather than the original source values.

In step 9.14, each final output from the loop construct object C.03 is threaded through the loop output construct object C.LO.1. Here "thread" means add the datum as an operand to the loop output construct object C.LO.1 and also as an output from the loop construct object C.03 and then connect the operations of each construct object C.01-C.N that use this datum to the newly created output rather than the original source values.

In step 9.16, for each variable modified and accessed inside the loop of instructions 4300-4399, a variable construct object C.V1-C.VN is constructed and is referenced to the loop construct object C.03. In step 9.18 a default value is supplied is supplied into each variable construct object C.V1-C.VN that lacks an initial value.

If the code in the initial sequence SEQ already contains some variable objects converted from the original opcode list 4000-4999, the processor 2A may convert the appropriate of these to variable objects in standard form, i.e., initializer first. The meaning of the term "accessed" as used herein may also optionally include variables modified inside a loop conditional area 4300-4398 even if an exemplary variable isn't actually used for anything inside the conditional loop 4300-4398 because a variable value, if modified, may in fact be needed by a subsequent iteration of the loop 4300-4399 that further modifies the value inside the loop 4300-4399. For example, the following exemplary C function is offered as illustrative but not limiting example:

```
int foo( int i, int n, int a, nt x )
{
    for( i = 0; i < n; i++ )
    {
        if( a == 12 )
            x = x + 1;
    }
    printf( "x = %d\n", x );
    return 0;
}
```

In a prior art compilers, the variable x is not a loop variable because it isn't accessed inside the loop 4300-4399 and only a final value of the variable x is applied. However, when one transforms this function into a circuit in accordance with certain optional aspects of the invented method, a relevant final value becomes a loop variable because in the stricter world of data flow, the loop circuit accesses itself to modify itself. Because the instant included loop logic expressions are inside a conditional area and inside a loop, to achieve the correct final result, a loop circuit, i.e., an electronic circuit that operates in accordance with a loop logic construct C.L1-C.Ln, requires predication in the form of being maintained as a loop variable.

Figure 10:
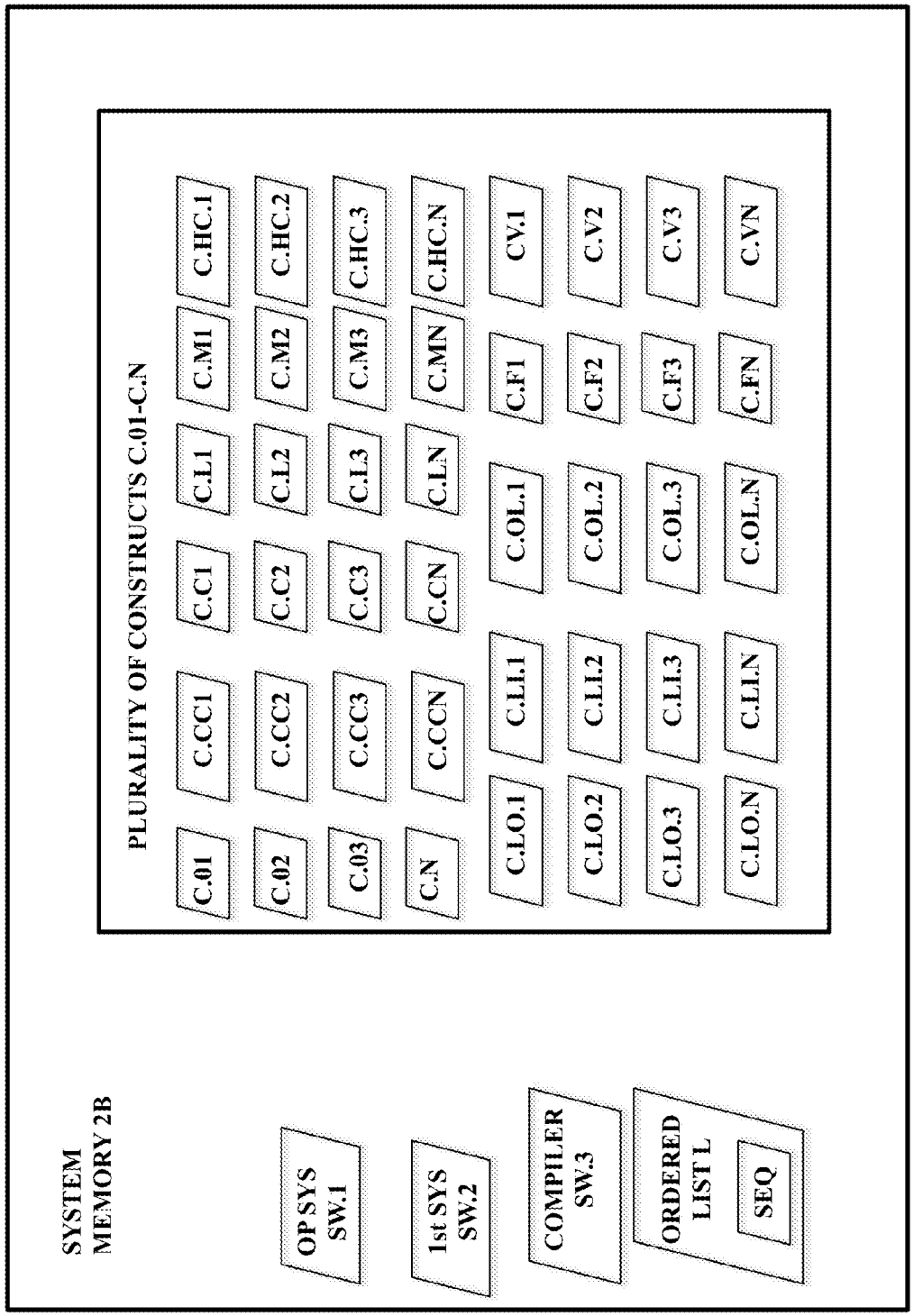
FIG. 10 is a detail illustration of the system memory of FIG. 1 and illustrating the plurality of constructs of FIG. 1 as comprising additional software constructs of the method of FIG. 8 and FIG. 9.

Referring now to FIG. 10, FIG. 10 is a detail illustration of the system memory 2B of FIG. 1 and illustrating the plurality of constructs C.01-C.N as comprising additional software constructs C.CC1-C.CCN, C.C1-C.CN, C.L1-C.LN, C.M1-C.MN, C.HC.1-C.HC.N, C.LO.1-C.LO.N, C.OL.1-C.OL.N, C.F1-C.FN &C.V1-C.VN. It is understood that one or more, or all software constructs C.CC1-C.CCN, C.C1-C.CN, C.L1-C.LN, C.M1-C.MN, C.HC.1-C.HC.N, C.LO.1-C.LO.N, C.LI.1-C.LI.N, C.OL.1-C.OL.N, C.F1-C.FN &C.V1-C.VN and each instruction 4000-4999 may be, comprise, be comprised within, or express a software object. It is further understood that one or more, or all software constructs C.CC1-C.CCN, C.C1-C.CN, C.L1-C.LN, C.M1-C.MN, C.HC.1-C.HC.N, C.LO.1-C.LO.N, C.LI.1-C.LI.N, C.OL.1-C.OL.N, C.F1-C.FN &C.V1-C.VN and each instruction 4000-4999 may be, comprise, or express an opcode and/or an opcode information.

Figure 11:
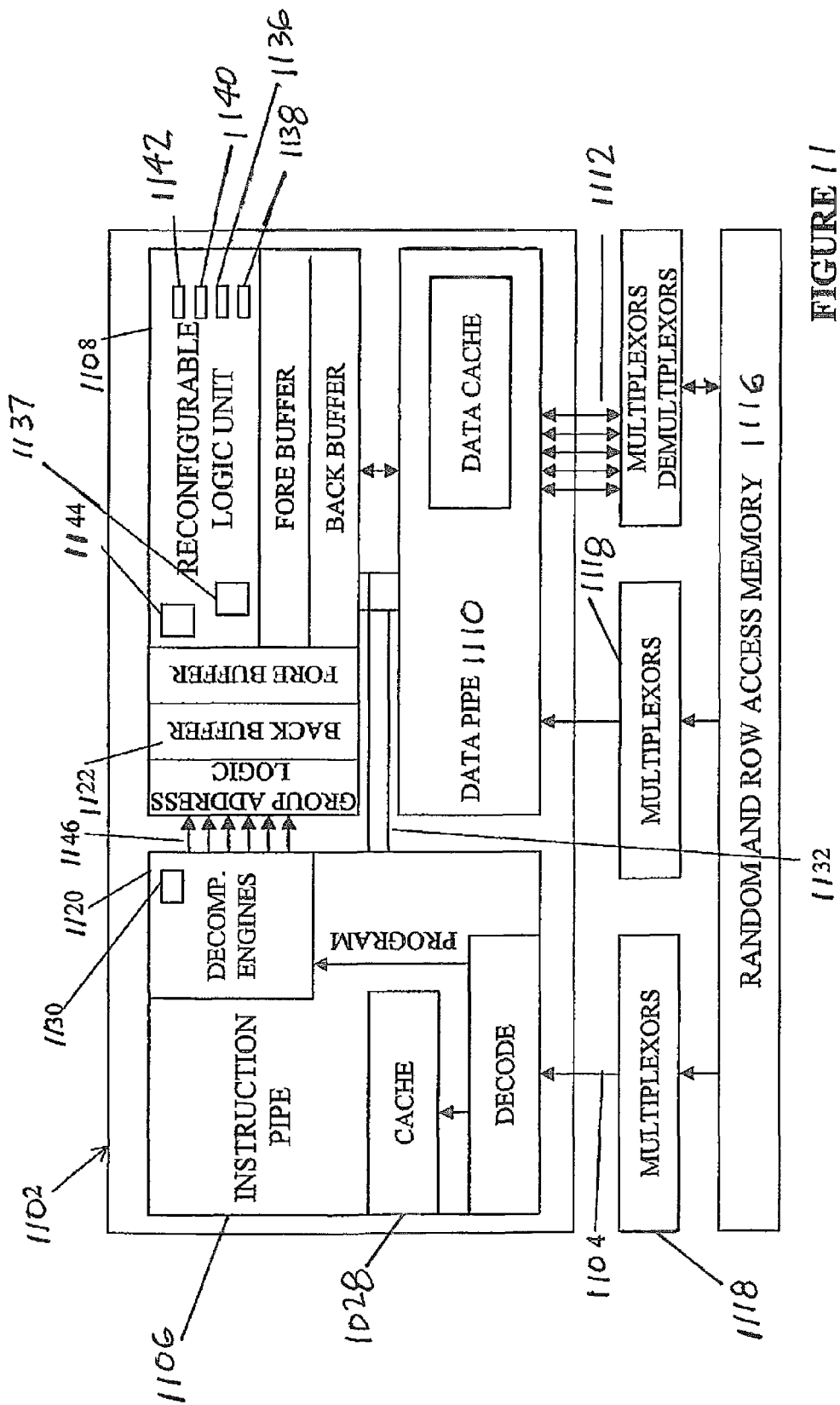
FIG. 11 is a schematic diagram of an exemplary first dynamically configurable processor (hereinafter, "second target circuit") as disclosed in U.S. Pat. No. 7,840,777 that may be, or be comprised within, the target circuit of FIG. 1.

FIG. 11 is a schematic diagram of a second target circuit 1102 that may be, or be comprised within, the target circuit T. The second target circuit 1102 is disclosed in U.S. Pat. No. 7,840,777 as the invented processor identified by element number two therein.

The second target circuit 1102 is an integrated circuit and includes an instruction bus 1104, an instruction pipe 1106, a reprogrammable logic unit 1108, a data pipe 1110 and a data bus 1112. The instruction bus 1104 receives instructions from a RAM 1116 that is outboard of the first target circuit 1102. The instructions are transmitted as digital logic signals from a RAM 1116 and via a set of clock-to-width multiplexers 1118 of the instruction source and to the instruction bus 1104. The instructions are then read from the instruction bus 1104 and into the instruction pipe 1106. The instruction pipe 1106 collects the instructions and decompresses the received instruction in a decompression circuit 1120. One, more than one, all or none of the instructions might be uncompressed and one, more than one, all or none of the instructions might be compressed. Uncompressed instructions are transmitted from the instruction pipe 1106 to the reprogrammable logic unit 1108, or RLU 1108. Compressed instructions are decompressed in the decompression circuit 1120 and transmitted from the instruction pipe 1106 to the RLU 1108. Alternatively or additionally, decompressed instructions may be stored in instruction buffers 1122 located within, or associated with, the instruction pipe 1106 and/or the RLU 1108.

The second target circuit 1102 can receive and respond to interrupt signals from the instruction pipe 1106, the data pipe 1110. The second target circuit 1102 can also elect to fetch new instructions from an external or off-chip source in response to an interrupt signal received from the same or another external or off-chip interrupt source, or upon the basis of data received and/or logical determinations produced by the data or logic processing of the second target circuit 1102 itself.

Compressed instructions are received by the instruction pipe 1106 from the instruction bus 1104 and may be immediately decompressed or may be stored in a pre-decompression instruction cache 1128. Compressed instructions may be stored in an instruction cache 1128 while other instructions, such as earlier received compressed instructions, are being decompressed. The instruction pipe 1106 will later elect to read a stored compressed instruction from the instruction cache 1128 and then decompress and transmit the decompressed instruction to the RLU 1108.

The RLU 1108 may execute one instruction while substantially simultaneously receiving another instruction from the instruction pipe 1106. The second target circuit 1102 may swap instructions by deciding, upon the base of data received and the execution of instructions, which decompressed instruction to execute from among two or more compressed instructions stored in the instruction cache 1128 or externally in the instance of a cache miss. Alternatively or additionally, the second target circuit 1102 may swap instructions by deciding, upon the base of data received and the execution of instructions, which compressed instruction to decompress and execute from among two or more compressed instructions stored in the instruction buffers 1122.

Alternatively or additionally, decompressed instructions may be stored in instruction buffers 1122, the instruction pipe 1106 and/or the RLU 1108. The storage of decompressed instructions in buffers 1122 enables the second target circuit 1102 to decide among two or more possible instructions to execute, whereby the processing of the second target circuit 1102 is used to direct the instruction level operation of the second target circuit 1102 itself. As an illustrative example, the second target circuit 1102 may determine, on the basis of the results of previously executed commands sent to the RLU 1108, that a particular instruction, that has been decompressed and stored in an instruction buffer of the instruction pipe 1106, should not be executed and should be ignored and overwritten. In this case the second target circuit 1102 eliminates a waste of time that would have occurred by unnecessarily executing this particular decompressed instruction. Alternatively and/or additionally, the compressed instructions may be stored in the instruction cache 1128.

The decompression circuit 1120 contains reprogrammable logic elements 1130 that accept decompression programming instructions from the instruction pipe 1106 and/or data pipe 1110, whereby the decompression method of the second target circuit 1102 may be defined, modified or altered by the instructions and/or data transmitted to the second target circuit 1102 via the data bus 1112 and/or instruction bus 1104. This reprogrammability of the decompression circuit 1120 extends the range of methods that the second target circuit 1102 can use in formatting, compressing, transmitting, and decompressing instructions transmitted to and from the first target circuit 1102. Certain instructions received by the instruction pipe 1106 may control the operations of the data pipe 1110. Instructions directing the storage, transmission, receipt, or movement of data or instructions stored in the data pipe 1110 can be transmitted from the instruction pipe 1106 via an instruction pathway 1132 of the decompression circuit 1120. The instruction pathway 1132 may decompress an instruction received by the instruction pipe 1106 in a compressed state and meant for transmission to the data pipe 1110.

Optionally included are two or more parallel decompression circuits 1120. These parallel decompression circuits 1120 act substantially simultaneously and decompress compressed instructions and/or elements or portions of instructions and substantially simultaneously transmit the resultant decompressed instructions and/or portions or elements of decompressed instructions to the RLU 1108.

The RLU 1108 includes a plurality of functional logic circuits, including but not limited to muxes 1136, parallel carry circuits 1137, cones 1138, iterators 1140 and look up tables 1142, i.e., muxes 1142. The RLU 1108 further comprises reprogrammable interconnects that enable the selective connection of the outputs of certain functional logic circuits 1136, 1137, 1138, 1140, & 1142 to the inputs of other functional logic circuits 1136, 1137, 1138, 1140, & 1142. It is significant that certain functional circuits 1136, 1137, 1138, 1140, & 1142 may be connected such that the output of a given circuit 1136, 1137, 1138, 1140, & 1142 is transmitted into the input of the same given circuit circuits 1136, 1137, 1138, 1140, & 1142.

In operation, the second target circuit 1102 may accept a set of instructions into the instruction pipe 1106, and decompress and transmit the instructions to the RLU 1108 and optionally the data pipe 1110. Data associated with the set of instructions may be accepted by the data pipe 1110 from an outboard RAM 1116 and via the data bus 1112. The second target circuit 1102 may then wait until the set of instructions has programmed and/or reprogrammed selected reprogrammable interconnects 1144 of the RLU 118. The second target circuit 1102 may wait for a propagation delay and a settling latency as the interconnects 1144 among and between functional logic circuits 1136, 1137, 1138, 1140, & 4112 of the RLU 1108 are established and settled. The second target circuit 1102 may then execute an instruction cycle, whereby a reprogrammable logic unit 8 (hereinafter, "RLU" 1108) executes the programming previously received in both the most recent transmission of instructions from a communications pipeline 46 as well as the programming received by the reprogrammable logic unit 8 in programming or reprogramming actions previous to the most recent receipt of instructions. This computing sequence of programming and reprogramming the reprogrammable logic unit 8 and optionally the data pipe 1110, and accepting data into the data pipe 1110 from the outboard RAM 1116, and then executing an instruction cycle after a programming and reprogramming delay and settling latency is used to efficiently deliver a set of instructions and data to the RLU 1108 and to efficiently execute one, or more than one, or a set of instructions in a single instruction cycle.

In a configuration period, the RLU 1108 reconfigures the interconnections among the functional logic elements circuits 1136, 1137, 1138, 1140, & 1142, to include muxes 1136, cones 1138, iterators 1140, look up tables 1142, logic gates, and other suitable logic circuits known in the art. This reconfiguration may be directed by instructions and/or data received by the RLU 1108 from the instruction pipe 1106, the data pipe 1110, and/or the interrupt source 1125. In a following execution cycle, the RLU 1108 executes an instruction and generates the results of digital logic processing by processing data and/or instructions generated by the second target circuit 1102 or by processing data and/or instructions received from the instruction pipe 1106, the data pipe 1110, and/or a interrupt source. The processing of data and/or instructions in the execution cycle is performed in accordance with the interconnections made during the configuration period and/or previous configuration periods and/or the results created by previous execution cycles.

The functional logic elements of the RLU 1108, including muxes 1136, cones 1138, iterators 1140, look-up tables 1142 and/or other suitable logic circuits known in the art, are addressable in blocks and may be substantially simultaneously configured en masse. An en mass configuring of a block of functional logic elements circuits 1136, 1137, 1138, 1140, & 1142 may affect the internal configuration of the functional logic elements circuits 1136, 1137, 1138, 1140, & 1142 and/or the interconnections of each functional logic unit circuits 1136, 1137, 1138, 1140, & 1142 to another functional logic element circuits 1136, 1137, 1138, 1140, & 1142, an external device, or to the first target circuit 1102. A block may be designated to comprise all addresses of functional logic elements above a low threshold address and below a high threshold address, either inclusive or exclusive of the threshold addresses. The block may consist of a single type of functional logic unit circuits 1136, 1137, 1138, 1140, & 1142, e.g. cones 1136, muxes 1138, iterators 1140, look up tables 4112, or another suitable type of logic circuit known in the art. This capability of the second target circuit 1102 enables highly efficient configuring of the RLU 1108 by the substantially simultaneously configuring of pluralities or multiplicities of functional logic elements circuits 1136, 1137, 1138, 1140, & 1142.

It is understood that the individual functional logic elements circuits 1136, 1137, 1138, 1140, & 1142 may be, or be comprised within, one or more electronic or electrical device or signal connectivity hardware resources R.01-R.N (or "circuitry" R.01-R.N) of the target circuit T.

Figure 12:
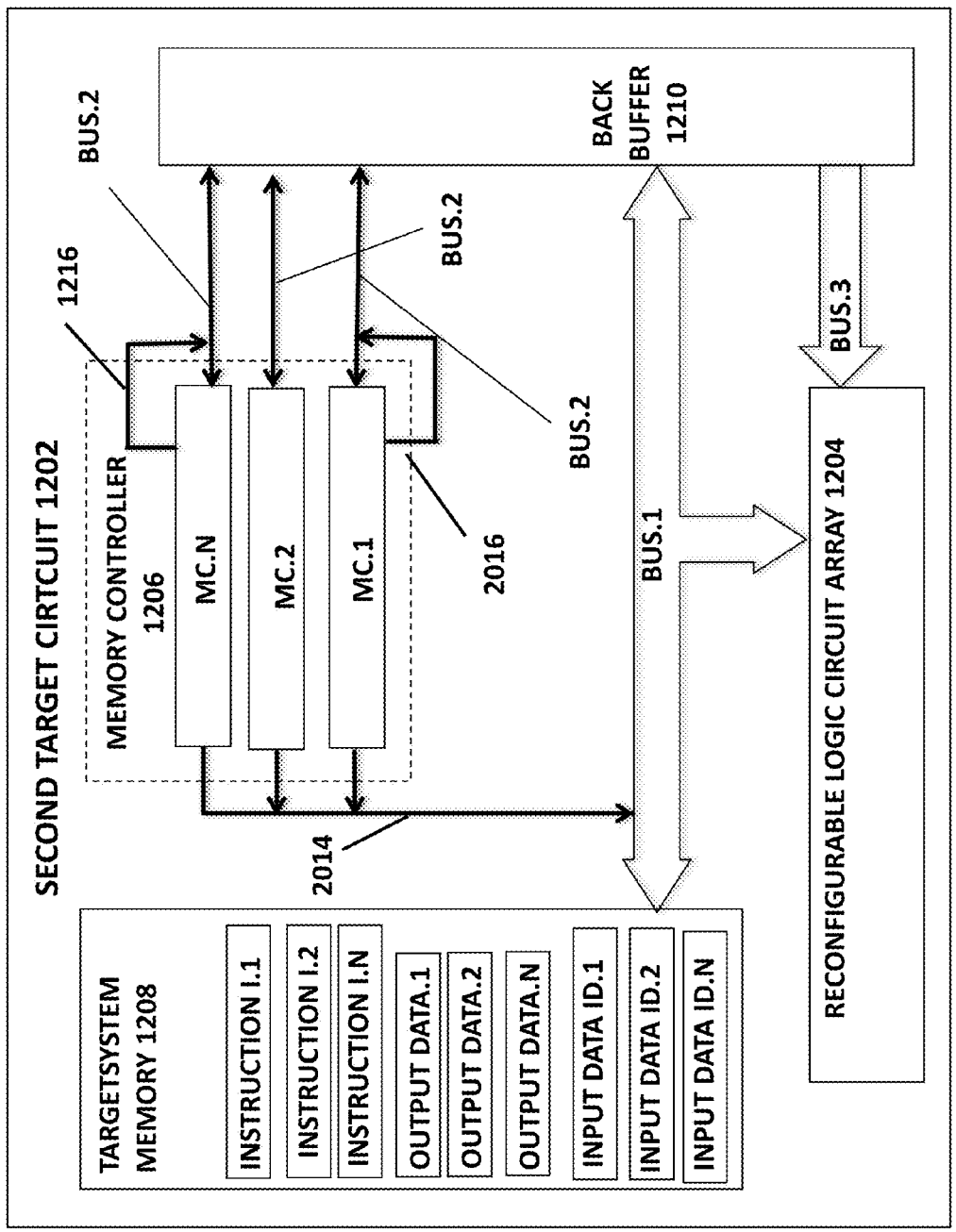
FIG. 12 is a schematic diagram of a third target circuit that may be, or be comprised within, the target circuit of FIG. 1 and as disclosed as the fourth device in U.S. Nonprovisional patent application Ser. No. 13/301,763.

FIG. 12 is a schematic diagram of a third target circuit 1202 that may be, or be comprised within, the target circuit T and as disclosed as the fourth device in U.S. Nonprovisional patent application Ser. No. 13/301,763.

The third target circuit 1202, indicated in FIG. 1 as "2TC 1202" comprises some or all of the features and elements of the fourth device as disclosed in U.S. Nonprovisional patent application Ser. No. 13/301,763. More particularly, third target circuit 1202 includes a reconfigurable logic circuit array 1204, a memory controller 1206, a target system memory 1208, a back buffer 1210, a clock pulse generator 1212, a first plurality of control lines 1214, a second plurality of control lines 1216, a first communications bus BUS.1, a plurality of second communications buses BUS.2, and a configuration bus BUS.3. The memory controller 1206 is a configurable logic circuit that is adapted to (a.) direct data flow through the first communications bus BUS.1 by means of the first plurality of control lines 1214; and (b.) direct data flow through the second communications bus BUS.2 by means of the second plurality of control lines 1216.

The memory controller 1206 of the third target circuit 1202 further comprises a plurality of memory controllers MC.1-MC.N, wherein each memory controller MC.1-MC.N memory controller MC.1-MC.N is coupled with the back buffer 1210 by one or more second communications buses BUS.2. It is understood that the memory controller 1206 and the plurality of memory controllers MC.1-MC.N are included in the scope of the meaning of the terms "hardware resource" and "circuitry" as defined and intended within the present disclosure. It is also understood that the memory controller 1206 and the plurality of memory controllers MC.1-MC.N are assignable circuitry and elements of the plurality of circuitry R.01-R.N of the computer 2.

The first communications bus BUS.1 enables bi-directional communications between the target system memory 1208 and unidirectional communications from the target system memory 1208 to the back buffer 1210.

The configuration bus BUS.3 enables configuration data to be delivered to the reconfigurable logic circuit array 1204, whereby by circuitry R.01-R.N of reconfigurable logic circuit array 1204 may be assigned and configured.

Figure 13:
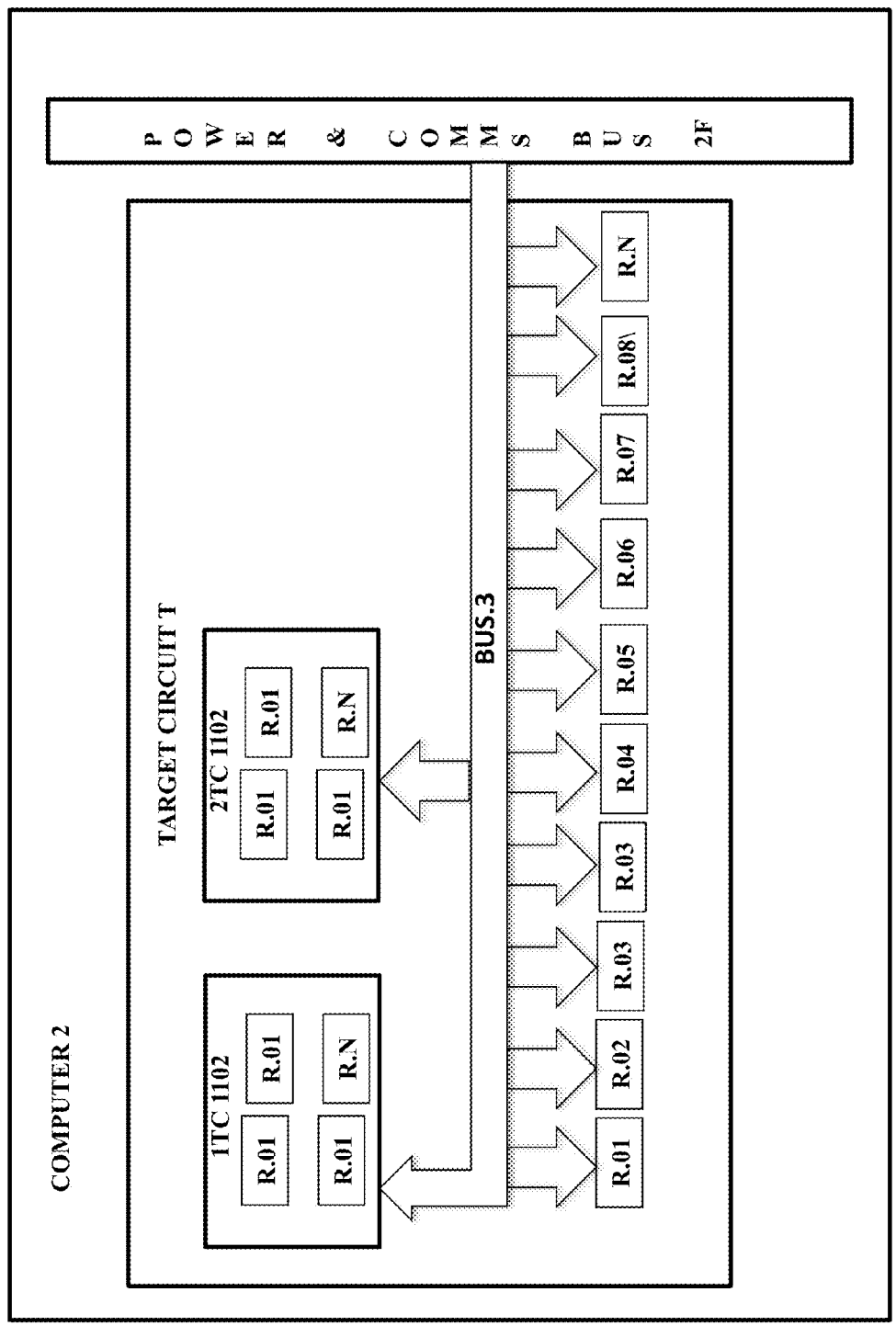
FIG. 13 is a schematic diagram of still additional and/or optional computational resources of the target circuit of FIG. 1 comprising a plurality of electronic circuitry, logic elements and logic circuits.

FIG. 13 is a detailed schematic diagram of the computer 2 and showing still additional and/or optional circuitry R.01-R.N of the target circuit T, the second target circuit 1102 and/or the third target circuit 1202 and comprising a plurality of circuitry R.01-R.N of logic elements and logic circuits. The uni-directional bus BUS.3 delivers configuration information provided by the system memory 2B, the target system memory 1208 and or the back buffer 1210 to the element logic circuitry R.01 and other circuitry R.02 through R.N of the target circuit T, and optional to the target system memory 1208 of the second target system memory 1208.

It is understood that the plurality of circuitry R.01-R.N of the target circuit T include a plurality of logic elements R.01, bitwise logic circuits R.02, wide logic circuits R.03, bit shifting circuits R.04, fast carry circuits R.05, fast partial product/multiplication circuitry R.06, word shifting circuits R.07, zero counting circuits R.08 and a variety of additional circuits R.N providing a variety of other functionalities in singularity or plurality.

Figure 14:
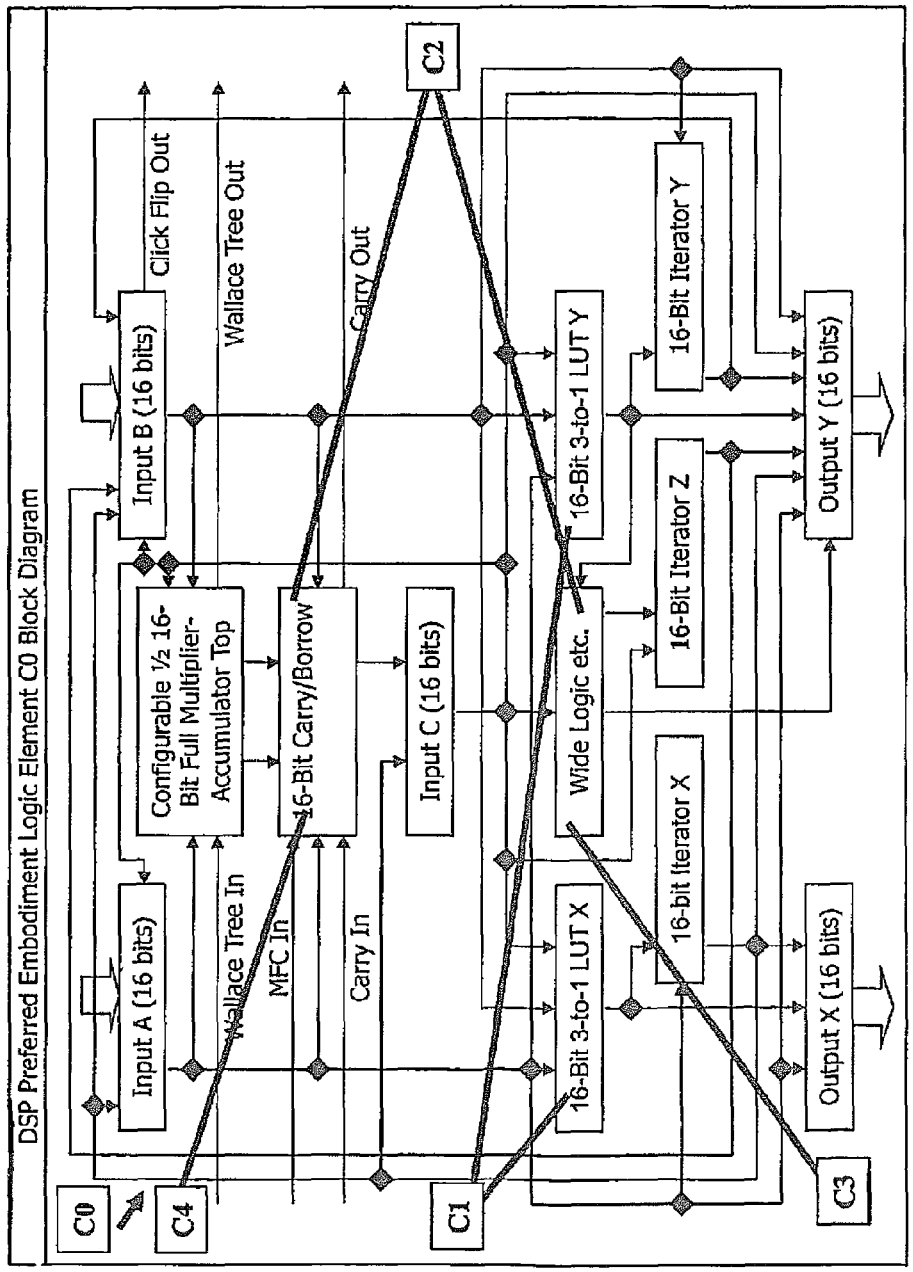
FIG. 14 is a schematic block diagram of an exemplary logic element of FIG. 13 and/or of the second target circuit of FIG. 11.

FIG. 14 is a schematic block diagram of an exemplary logic element circuitry R.01 of FIG. 13 and/or of the target circuit T, the second target circuit 1102, and/or the third target circuit 1202. The logic element circuitry R.01 is described in Figure C of U.S. Pat. No. 7,840,77 titled "DSP Preferred Embodiment Logic Element Block Diagram" and accompanying text. More particularly, as disclosed in U.S. Pat. No. 7,840, 777. The details of each of these blocks C1-C4 are described in U.S. Pat. No. 7,840,777. The logic element R.01 is designed to perform the computational operations of the software in an efficient manner. Logic elements R.01 taken as a whole need to be able to perform all necessary parts of software computations so that when used as a group they can perform various operation that appears in software. Minimally this functionality would include bitwise logic (C1), wide logic (C2), and bit shifting (C3). Practically it would almost certainly include things like dedicated fast carry circuitry (C4). More generally, the logic element is adapted to perform the operations of (1.) bit wise math; (2.) wide math; (3.) fast carry (and preferably fast addition and fast substraction); (4.) partial product generation (and preferably fast multiplication); (5.) bit to word expansion, including bit selection; (6.) bit shifting; and (7.) zero detection.

Each logic element circuitry R.01 is designed to perform the computational operations of an aspect of a software construct C.01-C.N. Logic element circuitry R.01-R.N taken as a whole preferably perform all necessary parts of software computations as coded in the software constructs C.01-C.N so that when used as a group the circuitry R.01-R.N can perform any computational operation that is coded in the software constructs C.01-C.N. Minimally this functionality would is provided by logic element circuitry R.01 by a bitwise logic circuit R.02, a wide logic circuit R.03, and a bit shifting circuit R.04. Practically it would almost certainly include things like dedicated fast carry circuitry R.05.

The optimization question for a given instruction mix is between size and functionality. Logic elements R.01 need to be small to minimize the power consumed by the RLU connections running long distances across many logic elements R.01. Logic elements R.01 preferably perform each required instruction mix quickly and by means of a small number of elements R.01 and/or additional types of circuitry R.02-R.N. In some cases this might involve structuring certain logic elements R.01 with special non-homogeneous properties in order to have a balance between small size and efficient operation of the logic elements R.01 and other circuitry R.02-R.N. In alternate preferred embodiments of the method of the present invention wherein certain logic elements R.01 are non-homogeneous, care must be taken to implement an effective optimization techniques of the compiler SW.3 that can handle the added heterogeneity.

Figure 15:
FIG. 15 is a representation of an exemplary second software construct of the plurality of software constructs of FIG. 1.

Referring now generally to the Figures and particularly to FIG. 15, FIG. 15 is a visual representation of the structure and informational contents of an exemplary second software construct C.02. It is understood that discussion and disclosure of second software construct presented herein is illustrative only and not limiting, and that one, each or all aspects of exemplary second software construct C.02 may be found or adapted by one, each or all of the individual software constructs of the plurality of software constructs C.01-C.N.

The second software construct C.02 may include a construct identifier C.ID that may be optional in certain alternate preferred embodiments of the method of the present invention. The second software construct C.02 may additionally include one or more logical expressions EXP.1-EXP.N that may be applied by the compiler SW.3 to select one or more circuitry R.01-R.N that will in singularity or in combination instantiate a logical expression, e.g., a computational step, coded in the second software construct C.02. The second software construct C.02 may further includes relatedness information INFO.01-INFO.N that encodes relatedness between the second software construct C.02 and one or more other software constructs C.01 and C.03-C.N. The relatedness information INFO.01-INFO.N may be used by the compiler to configure the circuitry R.01-R.N of the target circuit T to communicate with other circuitry R.01-R.N.

The second software construct C.02 may additionally, alternatively or optionally include additional information INFO.ADD useful to the compiler SW.3, the first system software SW.2 and/or the computer 2 in implementing the method of the present invention.

Figure 16:
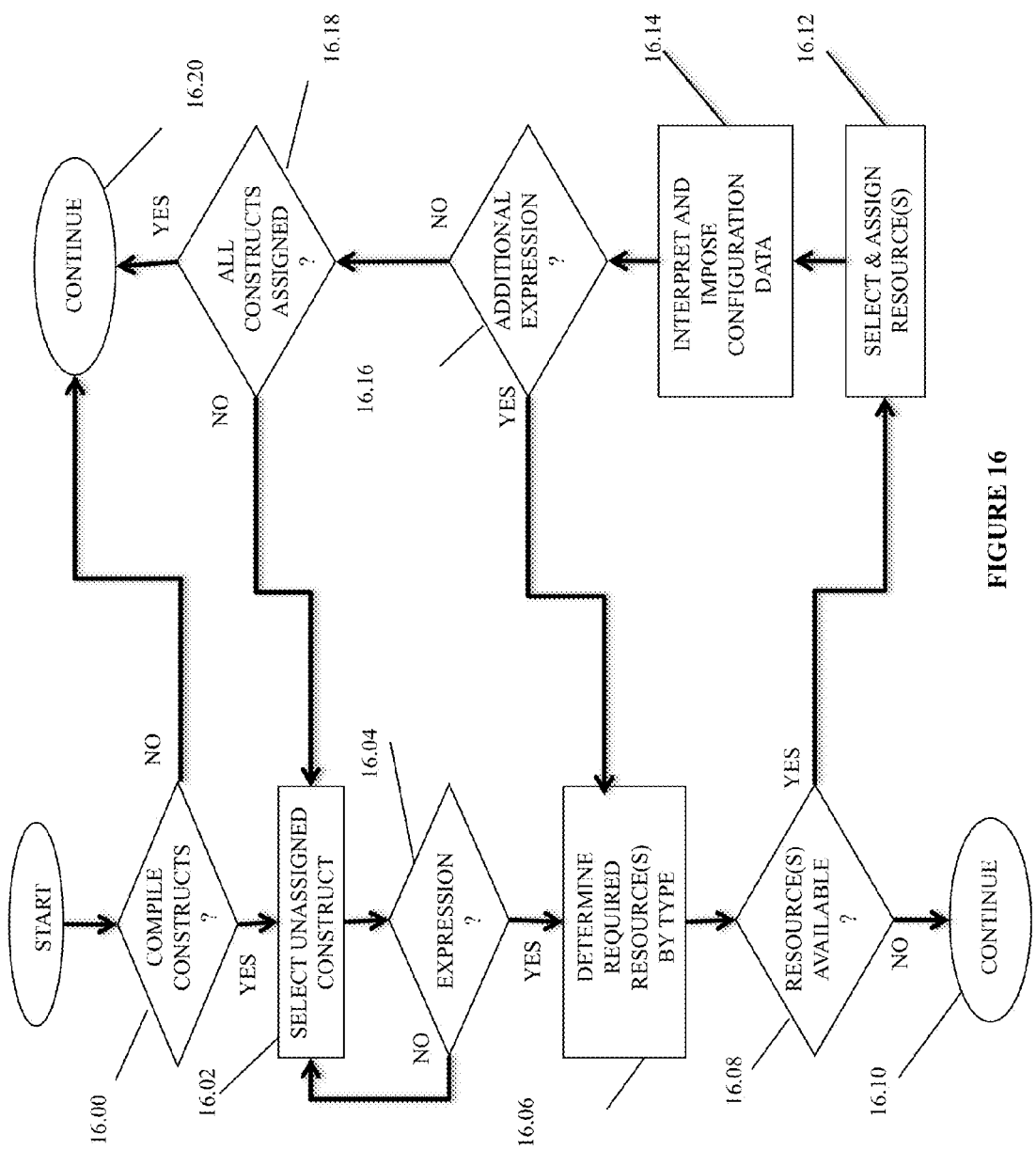
FIG. 16 is a flow chart of a preferred flow chart of certain aspects of the method of the present invention that may be implemented by the computer of FIG. 1.

Referring now generally to the Figures and particularly to FIG. 16, FIG. 16 is a flow chart of the computer 2 electing to apply the compiler SW.3 to generally sequentially select each software construct C.01-C.N from the plurality of software constructs C.01-C.N for implementation by means of the target circuit T, the first target circuit 1102, the second target circuit 1104, the RLU 1108 and/or the reprogrammable logic circuit array 1204. The computer determines whether to assign the plurality of software constructs C.01-C.N or a subset thereof for compilation by the complier SW.3 and application in programming, configuring and/or preparing the circuitry R.01-R.N to perform data processing or computational processing in accordance with the logic, values, instructions and information of the selected software constructs C.01-C.N selected in step 16.00. When the computer 2 determines in step 1600 to apply the compiler SW.3 to the selected software constructs C.01-C.N, the computer proceeds on from step 16.00 to step 16.02 and to select a first construct C.01 to which no circuitry R.01-R.N have been assigned. The compiler SW.3 then determines in step 16.04 if the software construct selected in step 16.02 contains a logical expression EXP.01-EXP.N that has not yet been assigned circuitry R.01-R.N. When the compiler SW.3 determines in step 16.04 if the software construct selected in step 16.02 contains a logical expression EXP.01-EXP.N that has not yet been assigned circuitry R.01-R.N, the compiler SW.3 determines in step 16.06 which type and quantity of circuitry R.01-R.N are required to be assigned to the selected construct C.01-C.N, and determines in step 16.08 whether the circuitry types and quantities determined in step 16.06 are available for assignment. When the compiler SW.3 determines in step 16.08 that the circuitry types and quantities determined in step 16.06 are not available for assignment within the target circuit T, the computer proceeds form step 16.08 and to step 16.10 and to report an error message vie the output module 12E and perform alternate computational operations.

When the compiler SW.3 determines in step 16.08 that the circuitry types and quantities determined in step 16.06 are available for assignment within the target circuit T, the computer proceeds form step 16.08 and to identify, select and assign the required circuitry R.01-R.N determined in step 16.06. The compiler SW.3 then in step 16.14 imposes configuration data upon the target circuit T relevant to the selected construct C.01-C.N and circuitry selected in step 16.12.

The compiler SW.3 next determines in step 16.16 whether the construct C.01-C.N selected in the most recent execution of step 16.02 has additional logical expressions EXP.01-EXP.N for which circuitry R.01-R.N have not yet been assigned. When the compiler SW.3 determines in step 16.16 that the construct C.01-C.N selected in the most recent execution of step 16.02 has at least additional logical expressions EXP.01-EXP.N for which circuitry R.01-R.N have not yet been assigned, the computer 2 proceeds form step 16.16 to an additional execution of step 16.06. When the compiler SW.3 determines in step 16.16 that the construct C.01-C.N selected in the most recent execution of step 16.02 has no additional logical expressions EXP.01-EXP.N for which circuitry R.01-R.N have not yet been assigned, the computer 2 proceeds form step 16.16 to step 16.18 and to determine if all of the constructs C.01-C.N selected or identified in the most recent execution of step 16.00 have had sufficient circuitry R.01-R.N assigned. When the compiler SW.3 determines in step 16.18 that all of the constructs C.01-C.N selected or identified in the most recent execution of step 16.00 have had sufficient circuitry R.01-R.N assigned, the computer 2 proceeds onto step 16.20 ad to perform additional computational processes, which may include directing the target circuit T to perform data processing or computational process in accordance with the plurality of constructs C.01-C.N.

When the compiler SW.3 determines that not all of the constructs C.01-C.N selected or identified in the most recent execution of step 16.00 have had sufficient circuitry R.01-R.N assigned, the computer 2 proceeds from step 16.18 and to step 16.02 and to select an unselected construct C.01-C.N for assignment of available circuitry R.01-R.N by the process of steps 16.04 through 16.16.

Figure 17:
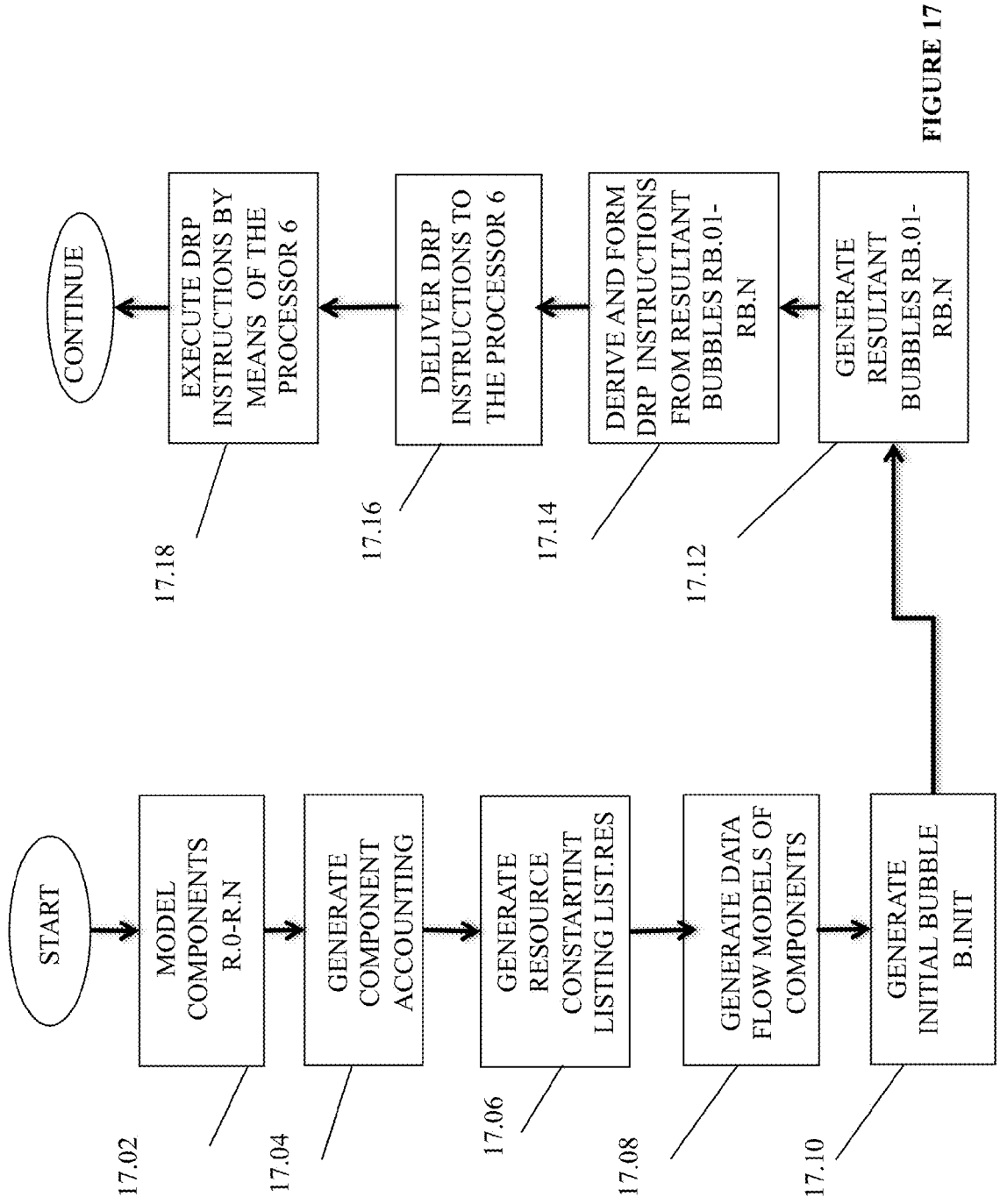
FIG. 17 is a process chart of the invented method in which resultant bubbles are derived from the plurality of software constructs of FIG. 1.

Referring now generally to the Figures and particularly to FIG. 17, FIG. 17 is a process chart of the invented method in which resultant bubbles R.B.01-RB.N are derived from the plurality of software constructs C.01-C.N. In step 17.02 selected types of components R.01-R.N of the reconfigurable processor 6 are individually and separately modeled as software encoded resources SR.001-SR.N, wherein one or more unique software-encoded resource SR.001-SR.N, or "resource" SR.001-SR.N, may be or include a data flow model DFM.001-DFM.N of a corresponding component type. For example, a look up table resource SR.LOOK is a data flow model DFM.008 of a look up table circuit R.08, i.e., a mux R.08.

In step 17.04 an accounting is made of the components R.01-R.N of the dynamically reconfigurable processor 6 by type and quantity that may be reconfigured with a single reconfiguration process of the dynamically reconfigurable processor 6. In step 17.06 this accounting is translated as a resource constraint listing LIST.RES that is stored in the computer 2, wherein the resource constraint listing LIST.RES specifies certain maximum quantities, and by specific types, of resources SR.001-SR.N that may be referenced within any single resultant bubble RB.01-RB.N. This resource constraint listing LIST.RES is used by the computer 2 to insure that no resultant bubble RB.01-RB.N requires more components R.01-R.N of the dynamically reconfigurable processor 6 than may be reprogrammed in a single or unified reconfiguration method, step or action.

In step 17.08 each of a plurality of construct data flow models DFM.001-DFM.N is generated and provided to the computer 2 in a model library LIB, wherein each data flow model DFM.001-DFM.N corresponds to a unique and separate type of software construct C.01-C.N. More particularly, each construct data flow model DFM.001-DFM.N is a software model that contains references to resources SR.001-SR.N that must be assigned to each instance of the assigned software construct type in order to represent the combination of components R.01-R.N that must in turn be assigned to instantiate the corresponding software construct type within the reconfigurable computer 6.

In step 17.10 an initial bubble B.INIT is generated by (a.) examining the plurality of software constructs C.01-C.N; (b.) generating an initial data flow model IDFW.01-IDFM.N of each of the plurality of software constructs C.01-C.N that have a corresponding construct data flow model DFM.001-DFM.N of the model library LIB; and (c.) populating the initial bubble B.INIT with the plurality of data flow models IDFW.01-IDFM.N.

In step 17.12 the initial bubble B.INIT is processed and wherein usually a plurality of resultant bubbles RB.01-RB.N are generated. The process of step 17.12 preferably insures that no resultant bubble RB.01-RB.N requires more components R.01-R.N of the dynamically reconfigurable processor 6 than may be reprogrammed in a single or unified reconfiguration method, step or action of the dynamically reconfigurable processor 6.

The plurality of resultant bubbles RB.01-RB.N are then processed into dynamically programmable processor instructions DRPI.001-DRPI.N, or "DRP instructions" DRPI.001-DRPI.N, in step 17.14 and provided to the reconfigurable processor 6 in step 17.16. The DRP instructions DRPI.001-DRPI.N derived in step 17.16 are then applied in step 17.18 to direct the computational processing of the dynamically reconfigurable processor 6. It is understood that in certain applications of the invented method, one or more of the process steps 17.08, 17.10, 17.12 and/or 17.14 may be performed wholly or partly by the dynamically reconfigurable processor 6. It is an object of the invented method to generate a plurality of resultant bubbles RB.001-RB.N, wherein no resultant bubble RB.001-RB.N is predicted to require more components R.01-R.N of the dynamically reconfigurable processor 6 than may be reprogrammed in a single or unified reconfiguration method, step or action of the dynamically reconfigurable processor 6.

Figure 18:
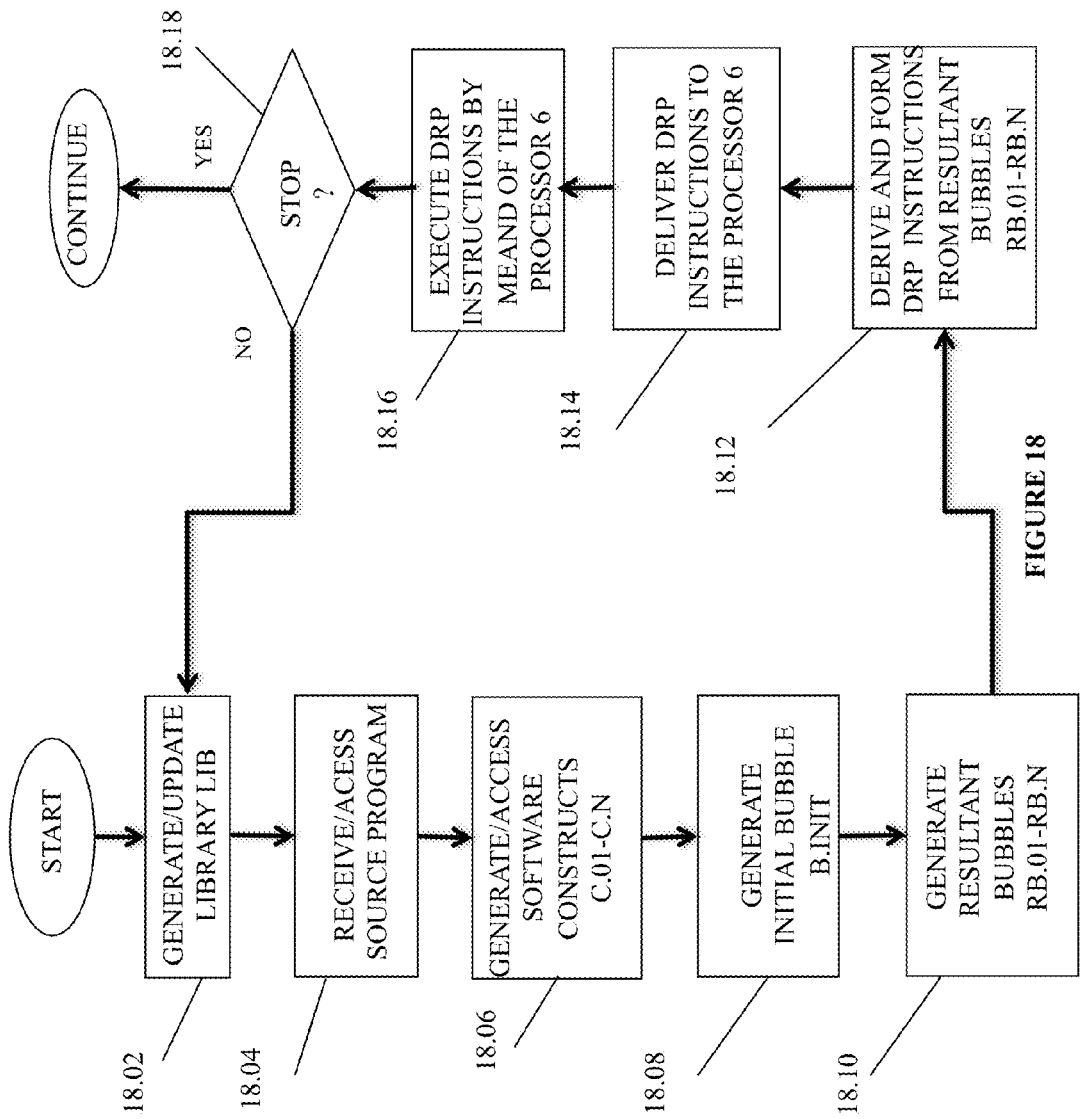
FIG. 18 is software flowchart of a first embodiment of the invented method that may be performed by one or more computers, the dynamically reconfigurable processor and/or the network of FIG. 2 in singularity or in concert.

Referring now generally to the Figures and particularly to FIG. 18, FIG. 18 is software flowchart of a first embodiment of the invented method that may be performed by one or more computers 2, the dynamically reconfigurable processor 6, and/or the communications network 4 in singularity or in concert. For the purposes of illustration only, and not meant as limiting the scope of applicability of the invented method, the steps of FIG. 18 will be discussed in view of a variation wherein each step of FIG. 18 is performed by the computer 2. It is understood that one or more steps of FIG. 18 through FIG. 27 may be performed by one or more computers 2, the dynamically reconfigurable processor 6, and/or the communications network 4 in singularity or in concert.

In step 1802 the model library LIB is generated, received, and/or updated by the computer 2 In step 1804 the ordered list L is received or accessed by the computer 2, and in step 1806 the plurality of constructs C.01-C.N are generated by application of the aspects of the invented method as disclosed in FIGS. 1 through 16 and accompanying text.

The initial bubble B.INIT is generated in step 1808 and one or more resultant bubbles RB.01-RB.N are derived from the initial bubble B.INIT and/or modified in step 18.10. It is understood that in certain cases where the ordered list L is very simple that a single resultant bubble RB.01 might be derived from the initial bubble B.INIT and no additional resultant bubbles RB.001-RB.N might be required or further generated in step 18.10. It is further understood that a plurality of intermediate bubbles B.001-B.N. may be generated in the process of step 18.10 of deriving resultant bubbles RB.001-RB.N.

One or more DRP instructions DRPI.001-DRPI.N are then derived from each resultant bubble RB.001-RB.N in step 18.12, and the DRP instructions DRPI.001-DRPI.N are then transmitted or made accessible to the dynamically reconfigurable computer 6 in step 18.14. The dynamically reconfigurable computer 6 may upon receipt of the DRP instructions DRPI.001-DRPI.N successively reconfigure components R.01-R.N of itself in accordance with the DRP instructions DRPI.001-DRPI.N and in order to instantiate the ordered list L. When the process of step 18.12 is performed by the dynamically reconfigurable computer 6, the DRP instructions DRPI.001-DRPI.N may then be directly applied by the dynamically reconfigurable computer 6 to dynamically and successively reconfigure itself in step 18.16.

The computer 2 proceeds from step 18.14 or alternately step 18.16 to step 18.18 and to determine whether to proceed back to additional execution of the loop of steps 1802 through 18.18, or to proceed on to perform alternate computational operations of step 18.20.

Figure 19:
FIG. 19 is a schematic drawing of an exemplary first intermediate bubble record of FIG. 1 that comprises an exemplary first intermediate bubble of FIG. 17.

Referring now generally to the Figures and particularly to FIG. 19, FIG. 19 is a schematic drawing of an exemplary first intermediate bubble record BREC.001 that comprises an exemplary first intermediate bubble B.001, wherein the first intermediate B.001 has been derived from the initial bubble B.INIT. It is understood that the exemplary first intermediate bubble B.001 and the first bubble record BREC.001 are presented and discussed to clarify and explain possible variations and aspects of bubbles B.001-B.N and resultant bubbles RB.001-RB.N in general. It is further understood further that the explanation of FIG. 19 is not intended to limit the scope of disclosure of possible aspects and variations of the bubbles B.001-B.N and resultant bubbles RB.001-RB.N.

The first intermediate bubble record BREC.001 includes (a.) a bubble record identifier BREC.ID that identifies and distinguishes the first intermediate bubble record BREC.001 from other bubble records BREC.001-BREC.N & RBREC.001-RBREC.N; (b.) a bubble identifier B.ID that identifies and distinguishes the first intermediate bubble B.001 from other bubbles B.001-B.N; and (c.) the first intermediate bubble B.001.

Figure 20:
FIG. 20 is a schematic drawing of an exemplary first data flow model record that comprises an exemplary first data flow model of FIG. 17.

The first intermediate bubble B.001 includes one or more data flow models DFM.001-DFM.N selected and copied from the model library LIB, wherein each DFM.001-DFM.N may include one or more resources SR.001-SR.N and/or references to resources SR.001-SR.N Referring now generally to the Figures and particularly to FIG. 20, FIG. 20 is a schematic drawing of an exemplary first data flow model record DFMREC.001 that comprises an exemplary first data flow model DFW.001, wherein the first intermediate B.001 has been derived from either the initial bubble B.INIT or from an intermediate bubble derived from the initial bubble B.INIT.

It is understood that the exemplary first data flow model DFM.001 and first data flow model record DFWREC.001 are presented and discussed to clarify and explain possible variations and aspects of data flow models DFM.001-DFM.N in general and further that the explanation of FIG. 20 is not intended to limit the scope of disclosure of possible aspects and variations of the data flow models DFM.001-DFM.N or model library LIB.

The first data flow model record DFMREC.001 includes (a.) a DFM record identifier DFMREC.ID that identifies and distinguishes the first data flow model record DFMREC.001 from other data flow model records DFWREC.001-DFWM-REC.N; (b.) a DFM identifier DFM.ID that identifies and distinguishes the first data flow model DFM.001 from other data flow models DFW.001-DFWM.N of the model library LIB; and (c.) one or more resources SR.001-SR.N and/or references to resources. Optionally and additionally, the first data flow model DFM.001 may include a reference to a resource SR.001-SR.N by type and a count of how many instances of that resource SR.001-SR.N are comprised within the first data flow model DFM.001.

Figure 21:
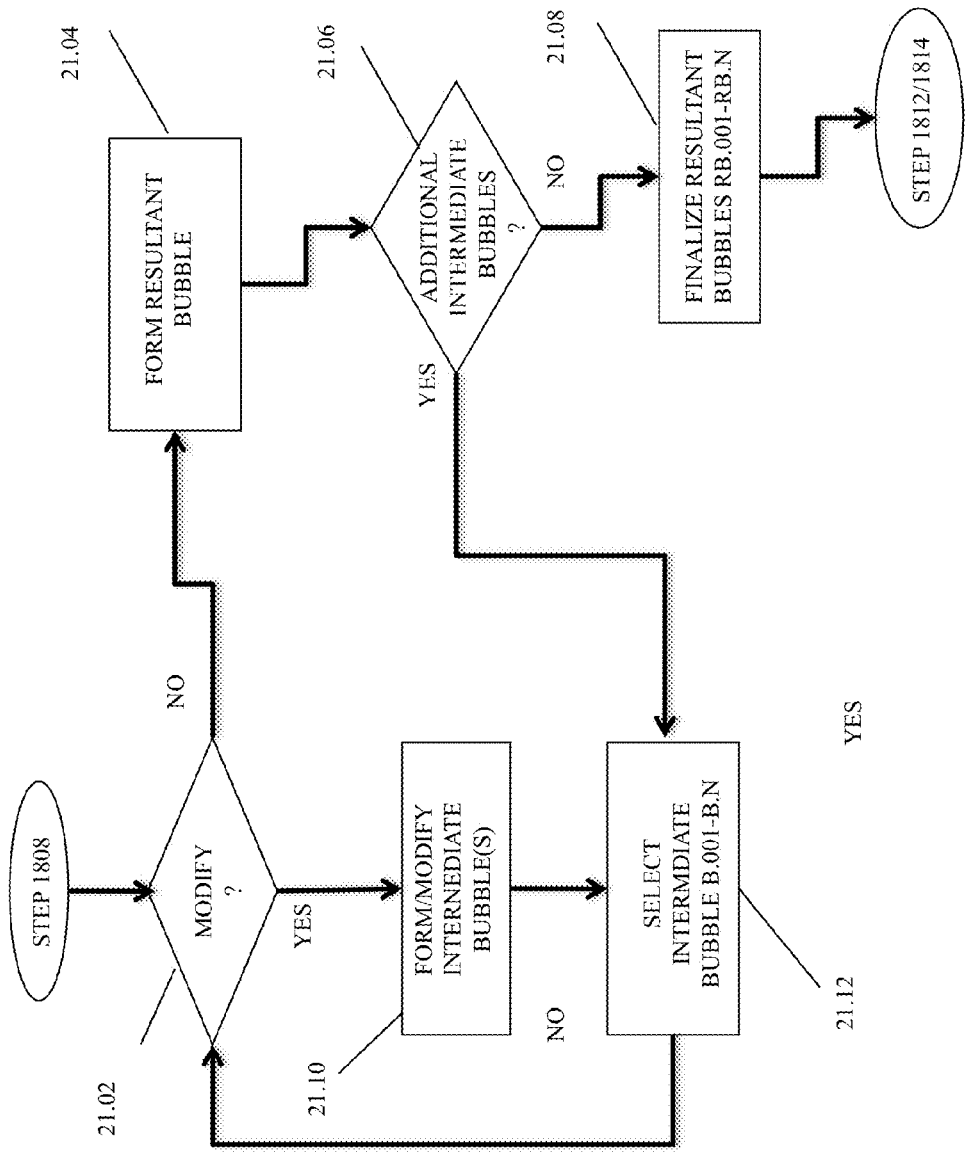
FIG. 21 is an expansion of a first preferred alternate method of applying step 18.10 of FIG. 18.

Referring now generally to the Figures and particularly to FIG. 21, FIG. 21 is an expansion of a first preferred alternate method of applying step 18.10 of FIG. 18. In a first application of step 2102 to a newly generated initial bubble B.INIT. The initial bubble B.INIT of step 1808 may be analyzed for possible processing into a derivation of a plurality of resultant bubbles RB.001-RB.N. In the rare case that the initial bubble B.INIT is so simple that the initial bubble B.INIT may be transformed into a single resultant bubble RB.001 without the modification or bubble splitting of step 2110, the computer 2 forms a first resultant bubble RB.001 in step 2104, optionally confirms in step 2106 that no unprocessed intermediate bubbles B.001-B.N are pending processing, and proceeds directly to step 2108 and therein to finalize the initial bubble B.INIT into a resultant bubble RB.001. The computer 2 will proceed from step 2108 to step 18.12 or 18.14.

When the computer examines an intermediate bubble B.001-B.N in step 2102 for eligibility to be modified and/or to be split into two or more additional intermediate bubbles B.002-B.N, the computer 2 will determine between proceeding either (a.) on to step 2104 and forming a resultant bubble RD.001-RB.N; or (b.) on to step 2110 to modify and/or splitting the bubble B.001-B.N examined in the current execution of step 2102 into two or more additional intermediate bubbles B.001-B.N. It is understood that intermediate bubbles B.001-B.N are selected in step 2112 for examination in a following repetition of an execution of step 2102.

When the computer determines to proceed from selecting a single intermediate bubble B.01-B.N in step 2112 to step 2102, and then determines in step 2102 that the selected bubble B.001-B.N of the most recent execution of step 2112 shall be transformed into a resultant bubble RB.001-RB.N, the computer 2 forms new resultant bubble record BREC.001-BREC.N in step 2104 and stores the selected intermediate bubble B.001-B.N of most recent execution of step 2112 into the newly formed resultant bubble record BREC.001-BREC.N.

The computer 2 proceeds from step 2104 to step 2106 to determine if any unprocessed intermediate bubbles B.001-B.N are pending processing. When the computer 2 determines in step 2106 that there are no unprocessed intermediate bubbles B.001-B.N pending processing through steps 2112 and 2102, the computer 2 proceeds on to step 2108 and finalizes the resultant bubbles RB.001-RB.N produced in executions of step 2110 and then. The computer 2 will proceed from step 2108 to step 18.12 or 18.14.

It is a key dynamic of the loop of steps 2102-2106, 2110 and 2112 that all the resultant bubbles RB.001-RB.N are derived from the initial bubble B.INIT and any intermediate bubbles B.001-B.N formed and/or modified in executions of step 2110.

Figure 22:
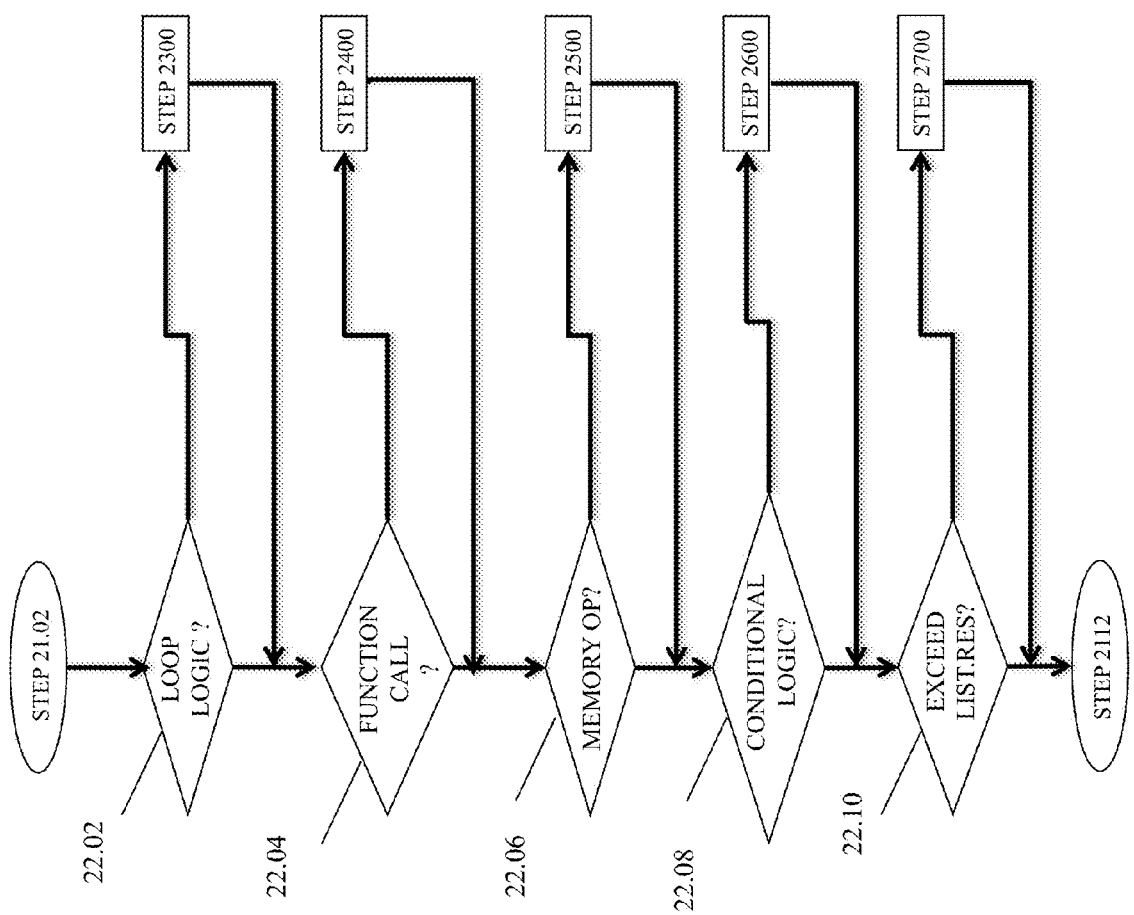
FIG. 22 is a software flowchart comprising aspects of a second embodiment of the invented method that may be performed as a variation of step 2110 of FIG. 21.

Referring now generally to the Figures and particularly to FIG. 22, FIG. 22 is software flowchart of aspects of a second embodiment of the invented method that may be performed as a variation of step 2110. For the purpose of clarity of explanation, the process of FIG. 22 shall be explained by selecting an exemplary second intermediate bubble B.002 as a bubble B.001-B.N to be examined in steps 22.02 through 22.10. The focus on the example of the second intermediate bubble B.002 in the text describing FIG. 22 is not meant to be limiting and may be in whole or in part applicable to the process of FIG. 22 as applied to one or more other bubbles B.001 & B.003-B.N In step 22.02 the computer 2 determines whether the second intermediate bubble B.002 contains any loop logic. When the computer 2 determines in step 22.02 that the second intermediate bubble B.002 contains loop logic, the computer 2 proceeds on to step 2300 and to split the second intermediate bubble B.002 as described in the process of FIG. 23. The computer 2 proceeds from either step 22.02 or step 2300 to step 22.04.

In step 22.04 the computer 2 determines whether the second intermediate bubble B.002 contains a function call. When the computer 2 determines in step 22.04 that the second intermediate bubble B.002 contains a function call, the computer 2 proceeds on to step 2400 and to split the second intermediate bubble B.002 as described in the process of FIG. 24. The computer 2 proceeds from either step 22.04 or step 2400 to step 22.06.

In step 22.06 the computer 2 determines whether the second intermediate bubble B.002 might impose, or under foreseeable circumstances threaten to cause, a memory overlap condition in conflict with another bubble B.0001 & B.003-B.N or software construct C.01-C.N.

Figure 25:
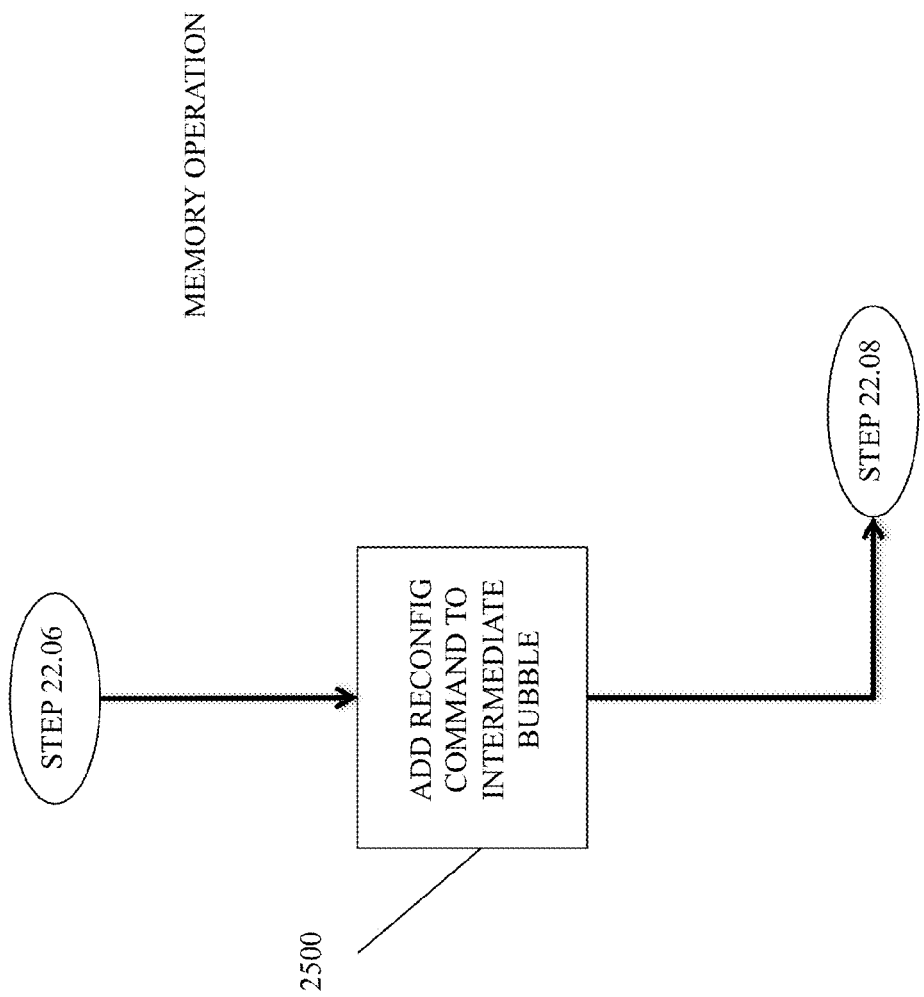
FIG. 25 is a detailed flowchart of the process of step 2500 of FIG. 22.

When the computer 2 determines in step 22.04 that the second intermediate bubble B.002 might impose a memory overlap condition, the computer 2 proceeds on to step 2500 and to modify the second intermediate bubble B.002 as described in the process of FIG. 25. The computer 2 proceeds from either step 22.06 or step 2500 to step 22.08.

In step 22.08 the computer 2 determines whether the second intermediate bubble B.002 contains any conditional logic. When the computer 2 determines in step 22.04 that the second intermediate bubble B.002 contains conditional logic, the computer 2 proceeds on to step 2600 and to split the second intermediate bubble B.002 as described in the process of FIG. 26. The computer 2 proceeds from either step 22.08 or step 2600 to step 22.10.

In step 22.10 the computer 2 determines whether the second intermediate bubble B.002 exceeds resource constraints of the resource listing LIST.RES. When the computer 2 determines in step 22.10 that the second intermediate bubble B.002 exceeds resource constraints of the resource listing LIST.RES, the computer 2 proceeds on to step 2700 and to split the second intermediate bubble B.002 as described in the process of FIG. 27. The computer 2 proceeds from either step 22.10 or step 2700 to step 2112.

Figure 23:
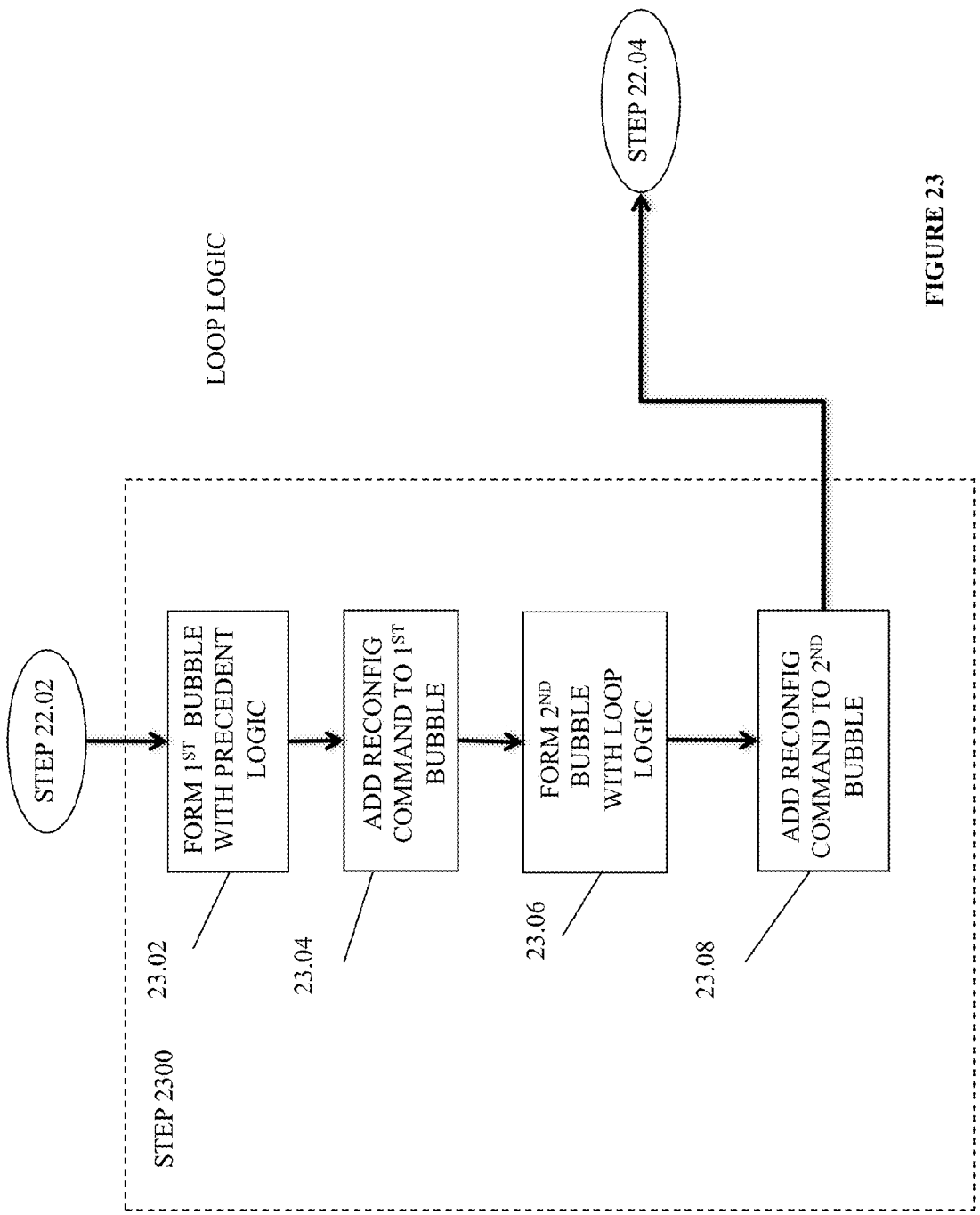
FIG. 23 is a detailed flowchart of the process of step 2300 of FIG. 22.

Referring now generally to the Figures and particularly to FIG. 23, FIG. 23 is a detailed flowchart of the process of step 2300. In step 23.02 a third intermediate bubble B.003 is derived by population of the third intermediate bubble B.003 with the precedent logic of the second intermediate bubble B.002. A processor reconfiguration command is added to the third intermediate bubble B.003 in step 23.04. In step 23.06 a fourth intermediate bubble B.004 is derived by population of the third intermediate bubble B.003 with the loop logic of the second intermediate bubble B.002. A processor reconfiguration command is added to the fourth intermediate bubble B.004 in step 23.08. The computer proceeds from step 23.08 to step 22.04 of the process of FIG. 22.

Figure 24:
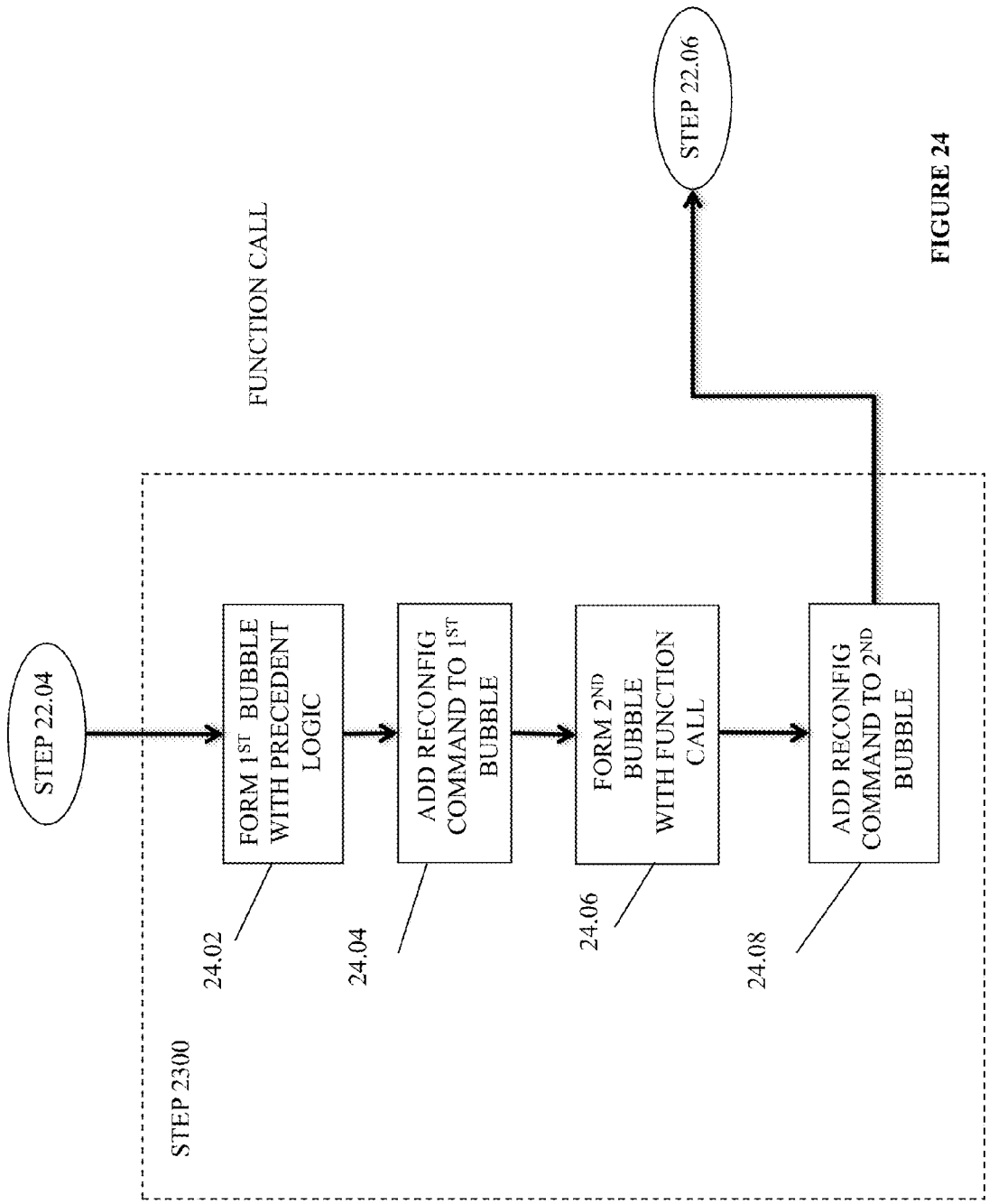
FIG. 24 is a detailed flowchart of the process of step 2400 of FIG. 22.

Referring now generally to the Figures and particularly to FIG. 24, FIG. 24 is a detailed flowchart of the process of step 2400. In step 24.02 a fifth intermediate bubble B.005 is derived by population of the fifth intermediate bubble B.005 with the precedent logic of the second intermediate bubble B.002. A processor reconfiguration command is added to the fifth intermediate bubble B.005 in step 24.04. In step 24.06 a sixth intermediate bubble B.006 is derived by population of the sixth intermediate bubble B.006 with the function call of the second intermediate bubble B.002. A processor reconfiguration command is added to the sixth intermediate bubble B.006 in step 24.08. The computer proceeds from step 24.08 to step 22.06 of the process of FIG. 22.

Referring now generally to the Figures and particularly to FIG. 25, FIG. 25 is a detailed flowchart of the process of step 2500. A processor reconfiguration command is added to the second intermediate bubble B.002 in step 2500. The computer proceeds from step 2500 to step 22.08 of the process of FIG. 22.

Figure 26:
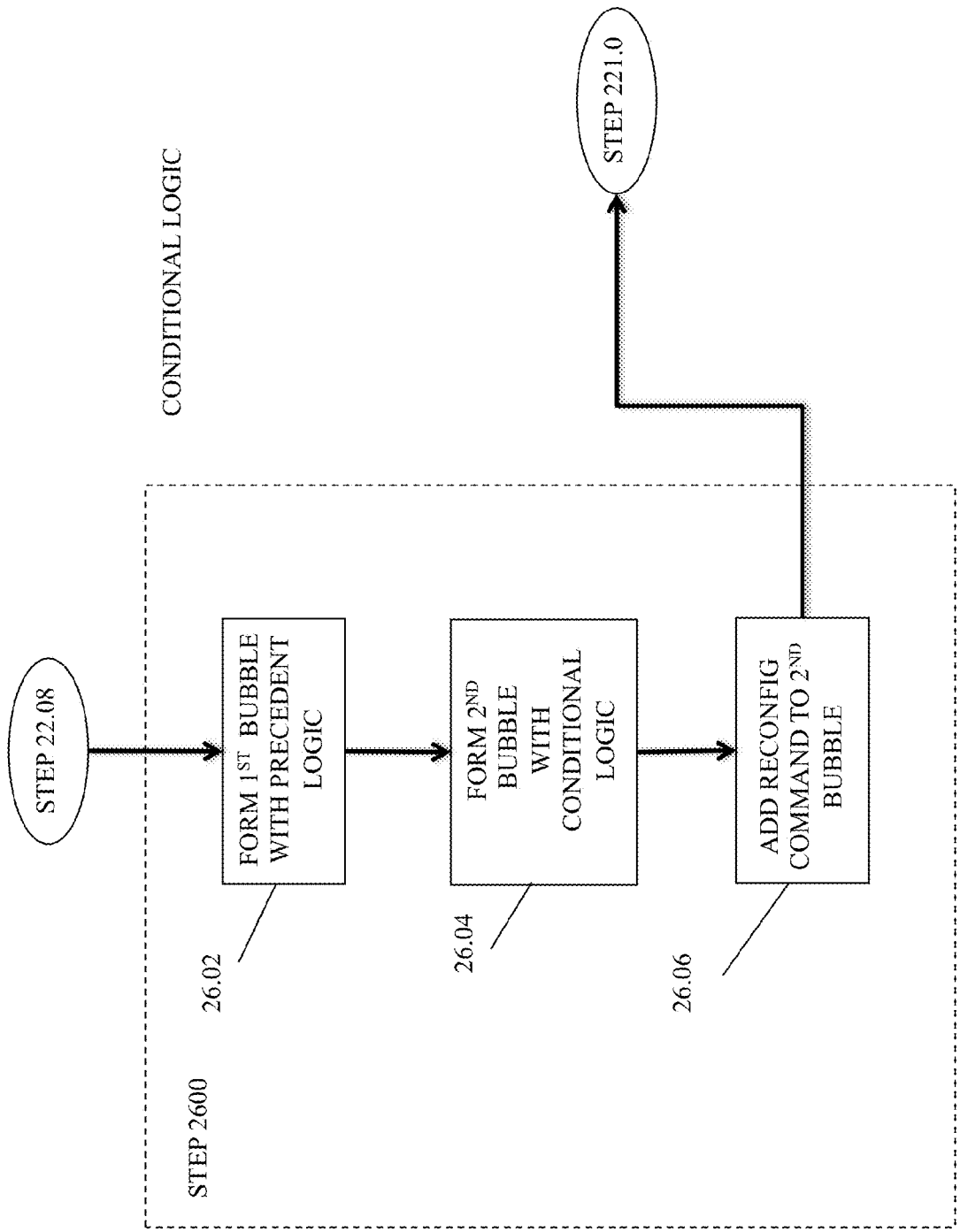
FIG. 26 is a detailed flowchart of the process of step 2600 of FIG. 22.

Referring now generally to the Figures and particularly to FIG. 26, FIG. 26 is a detailed flowchart of the process of step 2600. In step 26.02 a seventh intermediate bubble B.007 is derived by population of the seventh intermediate bubble B.005 with the precedent logic of the second intermediate bubble B.002. In step 26.04 an eighth intermediate bubble B.008 is derived by population of the eighth intermediate bubble B.008 with the conditional logic of the second intermediate bubble B.002. A processor reconfiguration command is added to the eighth intermediate bubble B.008 in step 26.06. The computer proceeds of from step 26.06 to step 22.10 of the process of FIG. 22.

Figure 27:
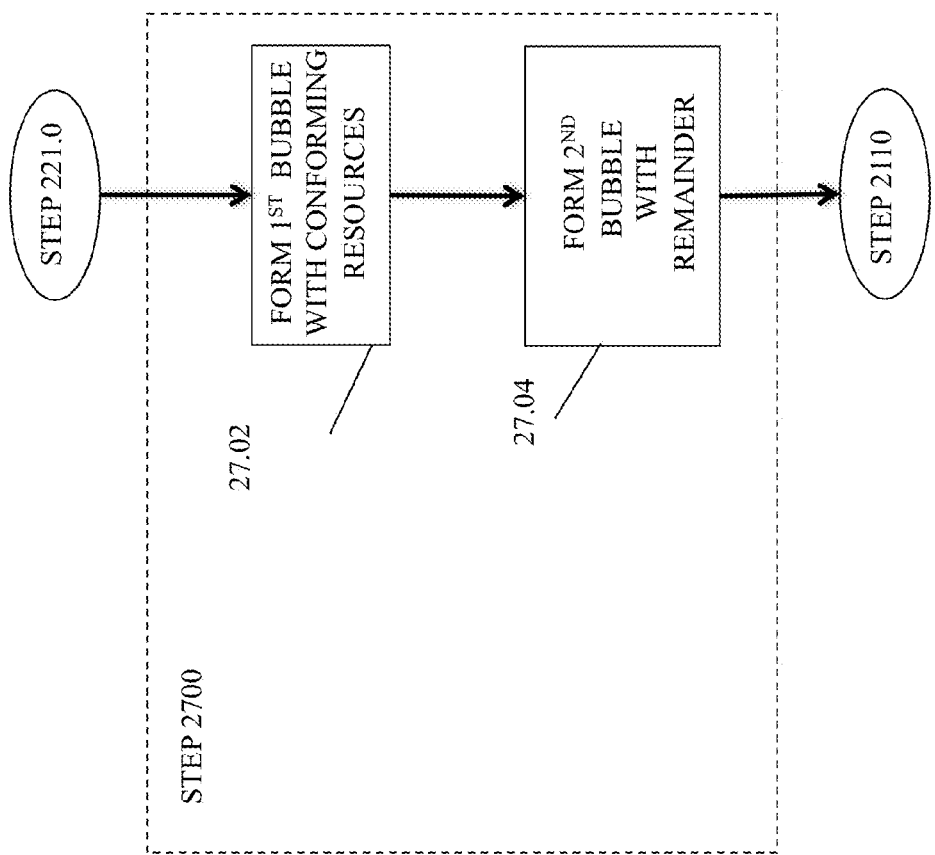
FIG. 27 is a detailed flowchart of the process of step 2400 of FIG. 22.

Referring now generally to the Figures and particularly to FIG. 27, FIG. 27 is a detailed flowchart of the process of step 2700. In step 27.02 a ninth intermediate bubble B.009 is derived by population of the ninth intermediate bubble B.009 with a fraction of the second intermediate bubble B.002 that is sized and selected to conform to the constraints of the resource constraint list LIST.RES. In step 27.04 a tenth intermediate bubble B.010 is derived by population of the tenth intermediate bubble B.010 with the contents of the second intermediate bubble B.002 that are not comprised within the ninth intermediate bubble B.009. The computer proceeds of from step 27.04 to step 2110 of the process of FIG. 21.

It is understood that all intermediate bubbles B.003-B.010 generated in the process of FIG. 22 are preferably each individually processed through the entire process of FIG. 22 prior to deriving a resultant bubble RB.001-RB.N from these intervening intermediate bubbles B.003-B.010 newly generated in steps 2300 through 2700. Furthermore, it is also understood that all intermediate bubbles B.003-B.010 generated in the process of FIG. 22 are preferably each processed through the entire process of FIG. 21 prior to deriving a resultant bubble RB.001-RB.N from these intervening intermediate bubbles B.003-B.010 newly generated in steps 2300 through 2700.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. In an information technology system, a method comprising:
   a. accessing a first data flow model of a first a software coded or software coded logical statement or instruction ("first software construct type"), wherein the first data flow model includes at least one resource, the at least one resource modeling a component of a dynamically reconfigurable processor, wherein the dynamically reconfigurable processor comprises:
      i. an instruction bus;
      ii. an instruction pipe coupled with the instruction bus;
      iii. a reconfigurable logic circuit array coupled with the instruction pipe;
      iv. a data pipe coupled with the reconfigurable logic circuit array; and
      v. a data bus coupled with the reconfigurable logic circuit array;
   b. initiating a compilation of a plurality of software constructs;
   c. determining a first instance of a software construct of the plurality of software constructs that conforms to the first software construct type; and
   d. expressing the first instance of the first software construct type as an instance of the first data flow model in a resultant data flow model generated from the compilation of the plurality of software constructs.

2. The method of claim 1, wherein the first data flow model comprises a plurality of resources, wherein each resource represents at least one component of a dynamically reconfigurable processor.

3. The method of claim 1, wherein the first data flow model comprises a function call.

4. The method of claim 1, wherein the resultant data flow model is comprised within a bubble.

5. The method of claim 4, further comprising:
   e. determining that the data flow model includes a loop logic;
   f. splitting the bubble into a first bubble and a second bubble, wherein:
      i. the first bubble includes logic precedent to the loop logic;
      ii. the second bubble includes the loop logic;
   g. adding a first processor reconfiguration command to the first bubble to direct the dynamically reconfigurable processor to reconfigure; and
   h. adding a second processor reconfiguration command to the second bubble to direct the dynamically reconfigurable processor to reconfigure.

6. The method of claim 4, further comprising:
   e. determining that the bubble includes a function call;
   f. splitting the bubble into a first bubble and a second bubble, wherein:
      i. the first bubble includes logic precedent to the function call;
      ii. the second bubble includes the function call;
   g. adding a first processor reconfiguration command to the first bubble to direct the dynamically reconfigurable processor to reconfigure; and
   h. adding a second processor reconfiguration command to the second bubble to direct the dynamically reconfigurable processor to reconfigure.

7. The method of claim 4, further comprising:
   e. determining that the bubble exhibits a potential memory operation overlap condition; and
   f. adding a processor reconfiguration command to the bubble to direct the dynamically reconfigurable processor to reconfigure.

8. The method of claim 4, further comprising:
   e. determining that the bubble includes a condition logic;
   f. splitting the bubble into a first bubble and a second bubble, wherein:
      i. the first bubble includes logic precedent to the condition logic;
      ii. the second bubble includes the condition logic; and
   g. adding a processor reconfiguration command to the second bubble to direct the dynamically reconfigurable processor to reconfigure.

9. The method of claim 4, further comprising:
   e. forming a listing of resource constraints of the dynamically reconfigurable processor;
   f. determining that the bubble of data includes a plurality of resources that exceeds the resource constraints of the dynamically reconfigurable processor; and
   g. splitting the bubble into a first bubble and a second bubble, wherein at least the first bubble does not exceed the resource constraints of the dynamically reconfigurable processor.

10. The method of claim 9, further comprising:
    e. determining that the second bubble includes a plurality of resources that exceeds the resource constraints of the dynamically reconfigurable processor; and
    f. splitting the second bubble into a third bubble and a fourth bubble, wherein at least the third bubble does not exceed the resource constraints of the dynamically reconfigurable processor.

11. In an information technology system, a method comprising:
    a. forming a library of software coded or software coded logical statements or instructions ("software construct types");
    b. generating a library of data flow models, wherein at least one data flow model uniquely corresponds to a specific software construct type, and the at least one data flow model comprises at least one resource representing a component of a dynamically reconfigurable processor, wherein the dynamically reconfigurable processor comprises:
       i. an instruction bus;
       ii. an instruction pipe coupled with the instruction bus;
       iii. a reconfigurable logic circuit array coupled with the instruction pipe;
       iv. a data pipe coupled with the reconfigurable logic circuit array; and
       v. a data bus coupled with the reconfigurable logic circuit array;
    c. accessing a plurality of software constructs;
    d. compiling the plurality of software constructs wherein a resultant data flow model is generated; and
    e. representing at least one software construct at least partially by the at least one data flow model.

12. The method of claim 11, wherein a plurality of the data flow models of the library of data flow models each comprise at least one resource representing a component of a dynamically reconfigurable processor.

13. The method of claim 11, wherein the at least one data flow model of the library of data flow models comprises a function call.

14. The method of claim 11, wherein the resultant data flow model comprises at least part of an instruction of a dynamically reconfigurable processor.

15. The method of claim 11, wherein the resultant data flow model comprises a plurality of instances of the at least one data flow model of the library of data flow models.

16. The method of claim 11, wherein the resultant data flow model comprises a loop logic.

17. The method of claim 11, wherein the resultant data flow model comprises a condition logic.

18. The method of claim 11, wherein the resultant data flow model comprises a function call.

19. The method of claim 11, wherein the resultant data flow model comprises a loop logic.

20. An information technology system comprising:
  a. a library of software coded or software coded logical statements or instructions ("software construct types");
  b. a library of data flow models, wherein at least one data flow model uniquely corresponds to a unique software construct type, and the at least one data flow model comprising at least one resource representing a component of a dynamically reconfigurable processor, wherein the dynamically reconfigurable processor comprises:
    i. an instruction bus;
    ii. an instruction pipe coupled with the instruction bus;
    iii. a reconfigurable logic circuit array coupled with the instruction pipe;
    iv. a data pipe coupled with the reconfigurable logic circuit array; and
    v. a data bus coupled with the reconfigurable logic circuit array;
  c. a plurality of software constructs; and
  d. a software compiler, the compiler adapted to compile the plurality of software constructs whereby a resultant data flow model is generated and at least one software construct is at least partially represented by the at least one data flow model.

* * * * *